US011106650B2

(12) United States Patent
Baba et al.

(10) Patent No.: US 11,106,650 B2
(45) Date of Patent: Aug. 31, 2021

(54) DATA SELECTION SYSTEM AND DATA SELECTION METHOD

(71) Applicant: HITACHI, LTD., Tokyo (JP)

(72) Inventors: Tsunehiko Baba, Tokyo (JP);
Kazuhide Aikoh, Tokyo (JP);
Toshihiko Kashiyama, Tokyo (JP);
Jumpei Okoshi, Tokyo (JP); Nobukazu Kondo, Tokyo (JP); Kentaro Kakui, Tokyo (JP)

(73) Assignee: HITACHI, LTD., Tokyo (JP)

( * ) Notice: Subject to any disclaimer, the term of this patent is extended or adjusted under 35 U.S.C. 154(b) by 60 days.

(21) Appl. No.: 16/807,228

(22) Filed: Mar. 3, 2020

(65) Prior Publication Data
US 2020/0285625 A1 Sep. 10, 2020

(30) Foreign Application Priority Data
Mar. 4, 2019 (JP) .............................. JP2019-038781

(51) Int. Cl.
*G06F 16/22* (2019.01)
*G06F 16/26* (2019.01)
*G06F 16/242* (2019.01)

(52) U.S. Cl.
CPC ........ *G06F 16/2282* (2019.01); *G06F 16/244* (2019.01); *G06F 16/26* (2019.01)

(58) Field of Classification Search
CPC .. G06F 16/258; G06F 16/244; G06F 16/2282; G06F 16/25; G06F 16/26; G06F 16/22; G06F 16/211

(Continued)

(56) References Cited

U.S. PATENT DOCUMENTS 4,275,519 A * 6/1981 Grunstad .............. B42F 17/346
40/378
6,681,227 B1 * 1/2004 Kojima ................. G06F 16/951
(Continued)

FOREIGN PATENT DOCUMENTS

JP 2017-167747 A 9/2017

OTHER PUBLICATIONS

European Search Report dated May 27, 2020 for the European Patent Application No. 20160799.1.

*Primary Examiner* — Shahid A Alam
(74) *Attorney, Agent, or Firm* — Volpe Koenig

(57) ABSTRACT

An analysis management server stores a factory A catalog group including a plurality of catalogs in factory A, an application destination catalog including a plurality of catalogs in factory B, and an application source analysis data correspondence table associating columns between a target table of factory A and a defect factor analysis table. A CPU is configured to: identify an unconnected catalog for which a catalog of factory B having an identical correspondence does not exist among the plurality of catalogs of factory A included in the application source analysis data correspondence table; identify an unconnected correspondence, which is a correspondence of the unconnected catalog in the application source analysis data correspondence table, sensor data of factory B, and an identical path correspondence which is a correspondence of a catalog on a path including the unconnected catalog; and display information of the unconnected correspondence and the identical path correspondence.

15 Claims, 18 Drawing Sheets

(58) Field of Classification Search
USPC .................................. 707/722, 770, 801
See application file for complete search history.

(56) References Cited

U.S. PATENT DOCUMENTS

| | | | |
|---|---|---|---|
| 2005/0102303 A1* | 5/2005 | Russell | G06F 16/211 |
| 2008/0114787 A1* | 5/2008 | Kashiyama | G06F 16/2272 |
| 2013/0297661 A1* | 11/2013 | Jagota | G06F 16/11 707/822 |
| 2017/0155877 A1* | 6/2017 | Johnson | A61B 5/1128 |
| 2019/0095545 A1 | 3/2019 | Yamato | |

* cited by examiner

FIG. 3

SENSOR DATA CATALOG 301

| COLUMN | ATTRIBUTE | UNIT | PERIOD | TYPE |
|---|---|---|---|---|
| DEVICE ID | String | | | |
| COMPONENT ID | String | | | |
| MEASUREMENT TIME | TimeStamp | | | |
| SENSOR VALUE | Integer | °C | EVERY SECOND | DEVICE TEMPERATURE |

FACTORY EQUIPMENT CATALOG 302

| COLUMN | ATTRIBUTE |
|---|---|
| FACTORY ID | String |
| PROCESS ID | String |
| WORK SECTION ID | String |
| EQUIPMENT ID | String |
| DEVICE ID | String |

INSPECTION RESULT CATALOG 303

| COLUMN | ATTRIBUTE |
|---|---|
| PRODUCT ID | String |
| MANUFACTURING DATE AND TIME | TimeStamp |
| INSPECTION RESULT | Boolean |
| DEFECT FACTOR | String |

WORKER CATALOG 305

| COLUMN | ATTRIBUTE |
|---|---|
| DEVICE ID | String |
| WORKER ID | String |
| WORK DATE AND TIME | TimeStamp |

COMPONENT CATALOG 306

| COLUMN | ATTRIBUTE |
|---|---|
| PRODUCT ID | String |
| PRODUCT NAME | String |
| COMPONENT ID | String |

DEFECT FACTOR ANALYSIS TABLE: TBL103  24

| PRODUCT ID | FACTORY ID | PROCESS ID | DEVICE ID | MANUFACTURING DATE | PROCESS START TIME | PROCESS COMPLETION TIME | SENSOR DATA TABLE ID | WORKER ID | INSPECTION RESULT |
|---|---|---|---|---|---|---|---|---|---|
| A001 | F007 | P001 | DA101 | 2018/09/20 | 13:21:15 | 13:23:10 | X008-3131 | M0431 | PASS |
| A001 | F007 | P002 | DA102 | 2018/09/20 | 15:41:20 | 15:55:05 | X009-3131 | M0840 | PASS |
| A001 | F007 | P003 | DA103 | 2018/09/21 | 09:10:00 | 09:49:56 | X010-3131 | M0640 | PASS |

MANUFACTURING DATE AND TIME

ANALYSIS APPLICATION CATALOG 27

| COLUMN NAME | ATTRIBUTE |
|---|---|
| APPLICATION ID | String |
| APPLICATION NAME | String |
| ANALYSIS TABLE | TableName |
| DESCRIPTION COLUMN | SrcColumnName |
| DESTINATION COLUMN | DstColumnName |

ANALYSIS APPLICATION TABLE  23

| APPLICATION ID | APPLICATION NAME | ANALYSIS TABLE | DESCRIPTION COLUMN | DESTINATION COLUMN |
|---|---|---|---|---|
| APP003 | DEFECT FACTOR ANALYSIS | DEFECT FACTOR ANALYSIS TABLE | PRODUCT ID TO WORKER ID | INSPECTION RESULT |
| APP007 | OPERATING STATUS MONITORING | OPERATION RECORD TABLE | ... | ... |

SENSOR DATE TABLE X008-3131  35

| DEVICE ID | COMPONENT ID | SENSOR TYPE | MEASUREMENT TIME | SENSOR DATA |
|---|---|---|---|---|
| DA101 | X008 | TEMPERATURE | 13:23:00 | 98,99,99,100… |

| CONNECTION SOURCE | CONNECTION DESTINATION | JOIN KEY |
|---|---|---|
| SENSOR DATA C | FACTORY EQUIPMENT C | DEVICE ID |
| SENSOR DATA C | COMPONENT C | COMPONENT ID |
| SENSOR DATA C | DEFECT FACTOR ANALYSIS T | DEVICE ID, MEASUREMENT TIME, MANUFACTURING DATE AND TIME |
| FACTORY EQUIPMENT C | DEFECT FACTOR ANALYSIS T | FACTORY ID |
| FACTORY EQUIPMENT C | DEFECT FACTOR ANALYSIS T | PROCESS ID |
| FACTORY EQUIPMENT C | DEFECT FACTOR ANALYSIS T | DEVICE ID |
| FACTORY EQUIPMENT C | WORKER C | DEVICE ID |
| WORKER C | DEFECT FACTOR ANALYSIS T | WORKER ID |
| COMPONENT C | DEFECT FACTOR ANALYSIS T | PRODUCT ID |
| COMPONENT C | INSPECTION RESULT C | PRODUCT ID |
| INSPECTION RESULT C | DEFECT FACTOR ANALYSIS T | MANUFACTURING DATE AND TIME, MANUFACTURING DATE AND TIME |
| INSPECTION RESULT C | DEFECT FACTOR ANALYSIS T | INSPECTION RESULT |

FIG. 6

SENSOR DATA CATALOG ~401

| COLUMN | ATTRIBUTE | UNIT | PERIOD | TYPE |
|---|---|---|---|---|
| DEVICE ID | String | | | |
| COMPONENT ID | String | | | |
| MEASUREMENT TIME | TimeStamp | | | |
| SENSOR VALUE | Integer | °C | EVERY SECOND | DEVICE TEMPERATURE |

FACTORY EQUIPMENT CATALOG ~402

| COLUMN | ATTRIBUTE |
|---|---|
| FACTORY ID | String |
| PROCESS ID | String |
| WORK SECTION ID | String |
| EQUIPMENT ID | String |
| DEVICE ID | String |

INSPECTION RESULT CATALOG ~403

| COLUMN | ATTRIBUTE |
|---|---|
| PRODUCT ID | String |
| MANUFACTURING DATE AND TIME | TimeStamp |
| INSPECTION RESULT | Boolean |
| DEFECT FACTOR | String |

DEFECT FACTOR ANALYSIS TABLE: TBL103 ~24

| PRODUCT ID | FACTORY ID | PROCESS ID | DEVICE ID | MANUFACTURING DATE | PROCESS START TIME | PROCESS COMPLETION TIME | SENSOR DATA TABLE ID | WORKER ID | INSPECTION RESULT |
|---|---|---|---|---|---|---|---|---|---|
| E003 | F004 | P001 | DB311 | 2018/08/29 | 09:13:47 | 09:24:08 | Y008-6770 | M0211 | PASS |
| E003 | F004 | P002 | DB312 | 2018/08/29 | 11:31:06 | 12:55:32 | Y008-6770 | M0309 | PASS |
| E003 | F004 | P003 | DB313 | 2018/08/29 | 14:21:15 | 14:59:11 | Y008-6720 | M0176 | PASS |

MANUFACTURING DATE AND TIME

WORKER CATALOG ~405

| COLUMN | ATTRIBUTE |
|---|---|
| WORK INSTRUCTION ID | String |
| WORKER ID | String |
| WORK DATE AND TIME | TimeStamp |

COMPONENT CATALOG ~406

| COLUMN | ATTRIBUTE |
|---|---|
| PRODUCT ID | String |
| PRODUCT NAME | String |
| COMPONENT ID | String |

WORK SECTION CATALOG ~407

| COLUMN | ATTRIBUTE |
|---|---|
| WORK INSTRUCTION ID | String |
| WORK SECTION ID | String |
| START DATE AND TIME | TimeStamp |
| QUANTITY | Integer |
| PRODUCTION RECORD | Integer |
| DEVICE ID | String |

ANALYSIS APPLICATION CATALOG ~27

| COLUMN NAME | ATTRIBUTE |
|---|---|
| APPLICATION ID | String |
| APPLICATION NAME | String |
| ANALYSIS TABLE | TableName |
| DESCRIPTION COLUMN | SrcColumnName |
| DESTINATION COLUMN | DstColumnName |

ANALYSIS APPLICATION TABLE ~23

| APPLICATION ID | APPLICATION NAME | ANALYSIS TABLE | DESCRIPTION COLUMN | DESTINATION COLUMN |
|---|---|---|---|---|
| APP003 | DEFECT FACTOR ANALYSIS | DEFECT FACTOR ANALYSIS TABLE | PRODUCT ID TO WORKER ID | INSPECTION RESULT |
| APP007 | OPERATING STATUS MONITORING | OPERATION RECORD TABLE | ... | ... |

SENSOR DATE TABLE Y008-3131 ~45

| DEVICE ID | COMPONENT ID | SENSOR TYPE | MEASUREMENT TIME | SENSOR DATA |
|---|---|---|---|---|
| DB311 | Y014 | TEMPERATURE | 09:23:00 | 93,97,94,95,... |

FIG. 8

UNDETECTED CORRESPONDENCE TABLE ~151

| # | CONNECTION SOURCE | CONNECTION DESTINATION | JOIN KEY | EXTRACTION STATE |
|---|---|---|---|---|
| 1 | FACTORY EQUIPMENT C | WORKER C | DEVICE ID | NON-CORRESPONDING |
| 2 | WORKER C | DEFECT FACTOR ANALYSIS T | WORKER ID | #1 CHILD, CONNECTED |
| 3 | SENSOR DATA C | FACTORY EQUIPMENT C | DEVICE ID | #1 PARENT, CONNECTED |

DETECTED CORRESPONDENCE TABLE ~152

| # | CONNECTION SOURCE | CONNECTION DESTINATION | JOIN KEY |
|---|---|---|---|
| 1 | SENSOR DATA C | FACTORY EQUIPMENT C | DEVICE ID |
| 3 | SENSOR DATA C | COMPONENT C | COMPONENT ID |
| 4 | COMPONENT C | INSPECTION RESULT C | PRODUCT ID |
| 5 | FACTORY EQUIPMENT C | DEFECT FACTOR ANALYSIS T | FACTORY ID |
| 6 | FACTORY EQUIPMENT C | DEFECT FACTOR ANALYSIS T | PROCESS ID |
| 7 | FACTORY EQUIPMENT C | DEFECT FACTOR ANALYSIS T | EQUIPMENT ID |
| 9 | COMPONENT C | DEFECT FACTOR ANALYSIS T | PRODUCT ID |
| 10 | INSPECTION RESULT C | DEFECT FACTOR ANALYSIS T | MANUFACTURING DATE AND TIME, MANUFACTURING DATE AND TIME |
| 11 | INSPECTION RESULT C | DEFECT FACTOR ANALYSIS T | INSPECTION RESULT |
| 12 | SENSOR DATA C | DEFECT FACTOR ANALYSIS T | MEASUREMENT TIME, MANUFACTURING DATE AND TIME |

~15

EXTRACTED CORRESPONDENCE TABLE ~153

| # | CONNECTION SOURCE | CONNECTION DESTINATION | JOIN KEY |
|---|---|---|---|
| 1 | WORK EQUIPMENT C | WORK SECTION C | DEVICE ID |
| 2 | WORK SECTION C | WORKER C | WORK INSTRUCTION ID |

UNRESOLVED CORRESPONDENCE TABLE ~154

| # | CONNECTION SOURCE | CONNECTION DESTINATION | JOIN KEY |
|---|---|---|---|
| | | | |

| CONNECTION SOURCE | CONNECTION DESTINATION | JOIN KEY | |
|---|---|---|---|
| SENSOR DATA C | FACTORY EQUIPMENT C | DEVICE ID | ⎫ RELATIONSHIP WHOSE CONNECTION RELATIONSHIP HAS BEEN DETERMINED WITH SAME CATALOG AND TABLE WITH FACTORY A |
| SENSOR DATA C | COMPONENT C | COMPONENT ID | |
| SENSOR DATA C | DEFECT FACTOR ANALYSIS T | DEVICE ID, MEASUREMENT TIME, MANUFACTURING DATE AND TIME | |
| FACTORY EQUIPMENT C | DEFECT FACTOR ANALYSIS T | FACTORY ID | |
| FACTORY EQUIPMENT C | DEFECT FACTOR ANALYSIS T | PROCESS ID | |
| FACTORY EQUIPMENT C | DEFECT FACTOR ANALYSIS T | DEVICE ID | |
| WORKER C | DEFECT FACTOR ANALYSIS T | WORKER ID | |
| COMPONENT C | DEFECT FACTOR ANALYSIS T | PRODUCT ID | |
| COMPONENT C | INSPECTION RESULT C | PRODUCT ID | |
| INSPECTION RESULT C | DEFECT FACTOR ANALYSIS T | MANUFACTURING DATE AND TIME, MANUFACTURING DATE AND TIME | |
| INSPECTION RESULT C | DEFECT FACTOR ANALYSIS T | INSPECTION RESULT | |
| SENSOR DATA C | FACTORY EQUIPMENT C | DEVICE ID | |
| FACTORY EQUIPMENT C | WORK SECTION C | DEVICE ID | ⎫ RELATIONSHIP EXTRACTED BASED ON CATALOG OF FACTORY B |
| WORK SECTION C | WORKER C | WORK INSTRUCTION ID | |

FIG. 17

ANALYSIS APPLICATION DATA MAPPING RESULT CORRECTION SCREEN — 1701

LOG-IN: USER A — 1402

ANALYSIS APPLICATION INFORMATION

| APPLICATION ID | APPLICATION NAME | ANALYSIS TABLE | DESCRIPTION COLUMN | DESTINATION COLUMN |
|---|---|---|---|---|
| APP003 | DEFECT FACTOR ANALYSIS | DEFECT FACTOR ANALYSIS TABLE | PRODUCT ID TO WORKER ID | INSPECTION RESULT |

CORRESPONDENCE CHANGE RESULT — 1403

UNDETECTED CORRESPONDENCE (SOURCE: FACTORY A)

| # | CONNECTION SOURCE | CONNECTION DESTINATION | JOIN KEY | STATUS |
|---|---|---|---|---|
| 1 | FACTORY EQUIPMENT C | WORKER C | DEVICE ID | NON-CORRESPONDING |
| 2 | WORKER C | DEFECT FACTOR ANALYSIS T | WORKER ID | #1 CHILD, CONNECTED |
| 3 | SENSOR DATA C | FACTORY EQUIPMENT C | DEVICE ID | #1 PARENT, CONNECTED |

EXTRACTED CORRESPONDENCE (TARGET: FACTORY B)

| # | CONNECTION SOURCE | CONNECTION DESTINATION | JOIN KEY |
|---|---|---|---|
| | N/A | N/A | N/A |

UNRESOLVED CORRESPONDENCE (TARGET: FACTORY B) — 1702

| # | CONNECTION SOURCE | CONNECTION DESTINATION | JOIN KEY | STATUS |
|---|---|---|---|---|
| 1 | FACTORY EQUIPMENT C | WORKER C | | NON-CORRESPONDING |
| 2 | WORKER C | DEFECT FACTOR ANALYSIS T | DEVICE ID | #1 CHILD, CONNECTED |
| 3 | SENSOR DATA C | FACTORY EQUIPMENT C | DEVICE ID | #1 PARENT, CONNECTED |

DIFFERENCE INFORMATION (SOURCE: FACTORY A, TARGET: FACTORY B) — 1703

| # | TARGET | DIFFERENT POINT |
|---|---|---|
| 1 | WORKER C | DELETION: DEVICE ID<br>ADDITION: WORK INSTRUCTION ID |
| 2 | WORK SECTION C | ADDITION: WORK INSTRUCTION ID, WORK SECTION ID, START DATE AND TIME, QUANTITY, PRODUCTION RECORD COUNT, DEVICE ID |
| 3 | FACTORY EQUIPMENT C | DELETION: WORK SECTION ID<br>ADDITION: WORK PLACE ID |

CORRECTED CORRESPONDENCE INPUT

CONNECTION SOURCE: ▶

CONNECTION DESTINATION: ▶

JOIN KEY: ▶

[Cancel] — 1603   [Submit] — 1604

DATA SELECTION SYSTEM AND DATA SELECTION METHOD

BACKGROUND OF THE INVENTION

1. Field of the Invention

The present invention relates to a technique for selecting application data to be used for execution of an application.

2. Description of the Related Art

Conventionally, data or the like obtained by sensors of equipment, devices, and the like in factories are input into an application for analysis (analysis application) to analyze the equipment, devices, and the like.

For example, the equipment and devices in factories are used for a long time, and update time of the equipment and devices differs from factory to factory, and thus, a data structure of data used in the operation of the factory is different for each factory in many cases. For this reason, when attempting to use an analysis application, which has been already used, in another factory, it is necessary to search for data necessary for creation of data for the analysis application (analysis data) from a large amount of data.

For example, JP 2017-167747 A discloses a technique for matching data of a device having data that can be used for an application by using each metadata.

SUMMARY OF THE INVENTION

As described above, when an existing analysis application is used in another factory, it is necessary to search for necessary data in order to create analysis data. Since the data structure of data managed at each factory is different, man-hours for searching for the necessary data become enormous. For example, when an entity-relationship (ER) diagram for factory data is not prepared, it is difficult to find the necessary data. Such a situation occurs similarly even in the case of searching for data to be used in another application without being limited to the analysis application.

The present invention has been made in view of the above circumstances, and an object thereof is to provide a technique capable of easily and appropriately selecting data necessary for generation of application data to be used in an application.

In order to achieve the above object, a data selection system according to one aspect is a data selection system configured to select data of an application table for use in an application capable of executing predetermined processing based on a plurality of tables in a predetermined object. The data selection system includes: a processor unit; and a storage unit connected to the processor unit. The storage unit stores a first catalog group including a plurality of catalogs indicating column configurations of a plurality of tables in a first object, a second catalog group including a plurality of catalogs indicating column configurations of a plurality of tables in a second object, and first correspondence information indicating correspondences of columns of a plurality of catalogs that associate columns between a target table of the first object and the application table. The processor unit identifies an unconnected catalog for which a catalog of the second object having an identical correspondence does not exist among the plurality of catalogs of the first object included in the first correspondence information based on the first correspondence information and the second catalog group. The processor unit identifies an unconnected correspondence, which is a correspondence of the unconnected catalog in the first correspondence information, and an identical path correspondence which is a correspondence of a catalog on a path including the unconnected catalog among a plurality of catalogs that connect the columns between the target table of the first object and the application table. The processor unit displays information of the unconnected correspondence and information of the identical path correspondence.

According to the present invention, it is possible to easily and appropriately select data necessary for generation of the application data to be used in the application.

BRIEF DESCRIPTION OF THE DRAWINGS

FIG. 3 is a configuration diagram of a table and a catalog relating to a factory A, a table and a catalog of an analysis application, and a defect factor analysis table according to the embodiment;

FIG. 4 is a diagram illustrating a correspondence between the table and the catalog relating to the factory A and the defect factor analysis table according to the embodiment;

FIG. 5 is a configuration diagram of an application source analysis data correspondence table of the factory A according to the embodiment;

FIG. 6 is a configuration diagram of a table and a catalog relating to a factory B and a table and a catalog of an analysis application according to the embodiment;

FIG. 8 is a configuration diagram of a management table according to the embodiment;

FIG. 9 is a configuration diagram of an extracted analysis data correspondence table for the factory B according to the embodiment;

FIG. 17 is a diagram illustrating an analysis application data result correction screen according to a modification.

DESCRIPTION OF THE PREFERRED EMBODIMENTS

Embodiments will be described with reference to the drawings. Incidentally, the embodiments to be described hereinafter do not limit the invention according to the claims, and further, all of the elements described in the embodiments and combinations thereof are not necessarily indispensable for the solution of the invention.

In the following description, information will be sometimes described with an expression such as "AAA table", but the information may be expressed with any data structure. In order to indicate that the information is not dependent on a data structure, "AAA table" can be called "AAA information".

In the following description, a "storage unit" includes one or more main storage devices (memories) or storages. At least one main storage device may be a volatile memory or a nonvolatile memory. The storage unit is mainly used during processing by a processor unit.

In addition, a "processor unit" includes one or more processors in the following description. At least one processor is typically a microprocessor such as a central processing unit (CPU). Each of the one or more processors may be a single-core or multi-core processor. The processor may include a hardware circuit that performs a part or whole of the processing.

Figure 1:
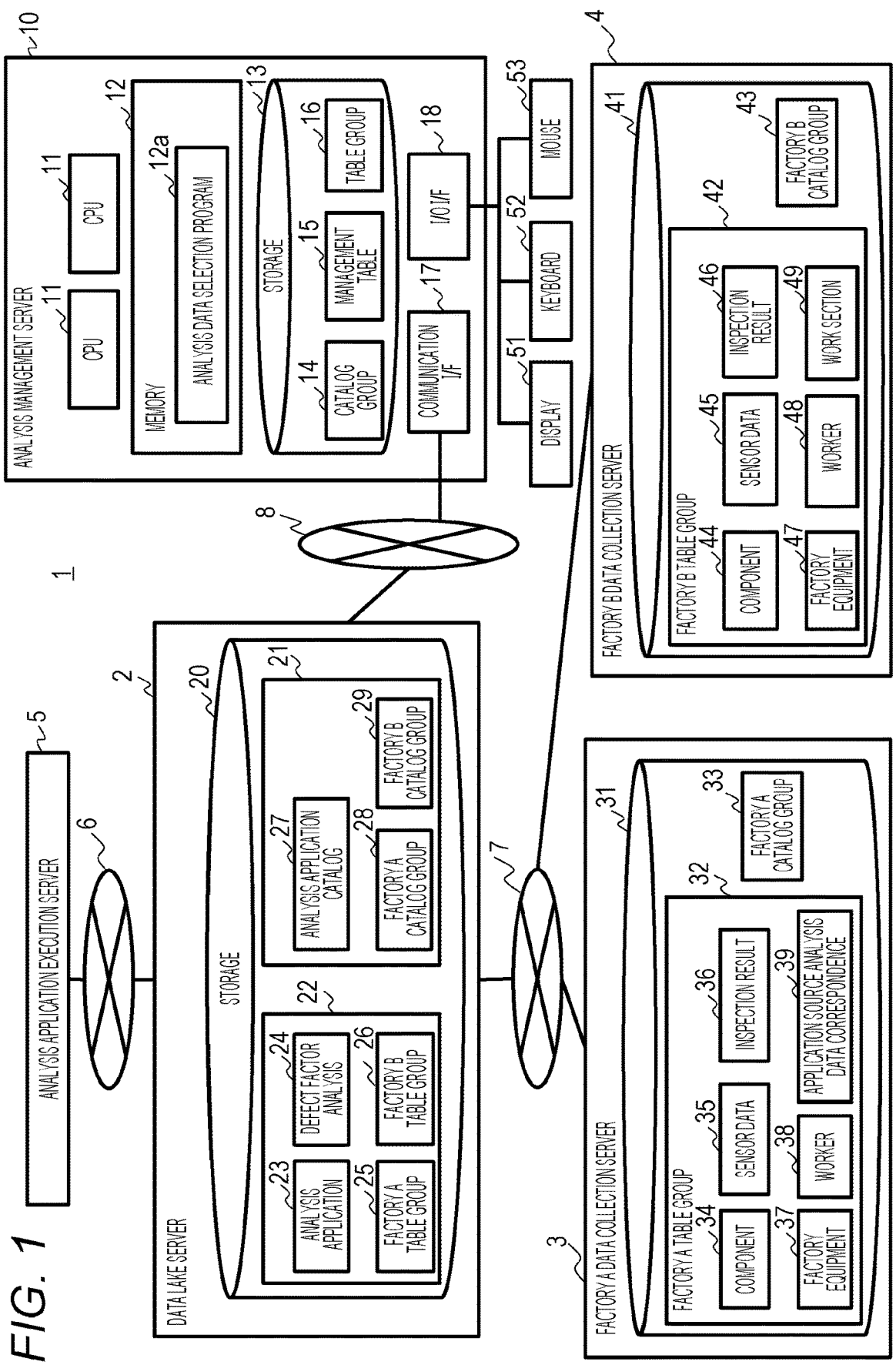
FIG. 1 is an overall configuration diagram of a computer system according to an embodiment.

FIG. 1 is an overall configuration diagram of a computer system according to an embodiment.

The computer system 1 includes a data lake server 2, a plurality of data collection servers 3 and 4, an analysis application execution server 45, and an analysis management server 10 which is an example of a data selection system. An analysis application server 5 is connected to the data lake server 2 via a network 6. The data lake server 2 is connected to the analysis management server 10 via a network 8 and is connected to the plurality of data collection servers 3 and 4 via a network 7. The networks 6, 7, and 8 are, for example, a wired local area network (LAN), a wireless LAN, the Internet, and the like. Incidentally, at least two of the networks 6, 7, and 8 may be configured as a single network.

The analysis application execution server 5 is, for example, a computer having a storage unit and a processor unit, and analysis processing on an analysis target is executed as the processor unit executes an analysis application to perform various types of analyses. Examples of the analysis application include an analysis application that performs defect factor analysis to analyze what causes a defect as an inspection result.

The analysis application can perform analysis processing using data in a predetermined format prepared for the application (for example, a defect factor analysis table 24 to be described later) as an input. For example, in the case of an analysis application for defect factor analysis, the analysis application execution server 5 receives the defect factor analysis table 24 from the data lake server 2 and performs the defect factor analysis. Here, in a factory A (an example of a first object), correspondences between the defect factor analysis table 24 and a plurality of tables in the factory A have already been recognized, and the defect factor analysis table 24 can be created based on the tables in the factory A. In the present embodiment, when a table configuration or the like is different between a factory B (an example of a second object) and the factory A, processing of identifying a correspondence between the table of the factory B and the defect factor analysis table 24 is performed in order to enable the analysis application to be applied even using the table or the like of the factory B.

The factory A data collection server 3 is a server that collects data of the factory A (first object) that is an application source as an analysis target of the analysis application, and is configured, for example, using a computer including a storage 31, which is an example of the storage unit, and a processor unit (not illustrated). The storage 31 stores a factory A table group 32 and a factory A catalog group (first catalog group) 33. The factory A table group 33 is, for example, a plurality of tables of a database configured to manage various types of information in the factory A, and includes, for example, a component table 34 storing data relating to components, a sensor data table 35, which is an example of a target table storing data output from a sensor, an inspection result table 36 storing inspection result data, a factory equipment table 37 to manage information on factory equipment, a worker table 38 to manage information on workers of the factory A, and an application source analysis data correspondence table (an example of first correspondence information) 39 indicating the correspondence between data of the table in the factory A and the defect factor analysis table 24 used for defect factor analysis in the analysis application execution server 5. The factory A catalog group 33 is a plurality of catalogs (an example of meta information) indicating configurations and the like of the respective tables of the factory A table group 32.

The factory B data collection server 3 is a server that collects data of the factory B (second object) that is an application destination to which analysis using the analysis application is newly applied, and is configured, for example, using a computer including a storage 41, which is an example of the storage unit, and a processor unit (not illustrated). The storage 41 stores a factory B table group 42 and a factory B catalog group (second catalog group) 43. The factory B table group 43 is, for example, a plurality of tables of a database configured to manage various types of information in the factory B, and includes, for example, a component table 44 storing data relating to components, a sensor data table 45 storing data output from a sensor, an inspection result table 46 storing inspection result data, a factory equipment table 47 to manage information on factory equipment, a worker table 48 to manage information on workers of the factory B, and a work section table 49 to manage work sections. The factory B catalog group 43 is a plurality of catalogs that are meta information indicating configurations of the respective tables of the factory B table group 42.

The data lake server 2 is configured using, for example, one or more general-purpose server devices, and stores and manages various types of information. The data lake server 2 has a storage 20. The storage 20 stores a table group 22 and a catalog group 21.

The table group 22 includes an analysis application table 23, the defect factor analysis table 24 which is an example of an application table, a factory A table group 25, and a factory B table group 26. The factory A table group 25 is a table group acquired from the factory A table group 32 of the factory A data collection server 3, and may include all the tables of the factory A table group 32. The factory B table group 26 is a table group acquired from the factory B table group 42 of the factory B data collection server 4, and may include all the tables of the factory B table group 42.

The catalog group 21 includes an analysis application catalog 27, a factory A catalog group 28, and a factory B catalog group 29. The analysis application catalog 27 is a catalog (an example of meta information) indicating a configuration of the analysis application table 23 and the like. The factory A catalog group 28 is a catalog group acquired from the factory A catalog group 33 of the factory A data collection server 3, and may include all the catalogs of the factory A table group 33. The factory B catalog group 29 is a catalog group acquired from the factory B catalog group 43 of the factory B data collection server 4, and may include all catalogs of the factory B table group 43.

The analysis management server 10 includes one or more CPUs 11, a memory 12 and a storage 13, which are examples of the storage unit, a communication interface (IF) 17, and an I/O interface (IF) 18.

The communication IF 17 is, for example, a network interface card (NIC), and communicates with other devices (such as the data lake server 2) via the network 8. The I/O IF 18 performs data input/output with a display device such as a display 51 and input devices such as a keyboard 52 and a mouse 53, for example.

The CPU 11 executes various types of processing according to programs stored in the memory 12 and/or the storage 13.

The memory 12 is, for example, a random access memory (RAM), and stores a program executed by the CPU 11 (for example, an analysis data selection program 12a) and necessary information.

The storage 13 is, for example, a hard disk, a flash memory, or the like and stores a program to be executed by the CPU 11 and data to be used by the CPU 11. In the present embodiment, the storage 13 stores a catalog group 14, a management table 15, and a table group 16. The catalog group 14 is a catalog group necessary for processing out of the catalog groups 21 of the data lake server 2. In the present embodiment, the catalog group 14 includes all the catalogs of the factory B catalog group 43, for example. In the present embodiment, catalogs having the same content are denoted by the same reference sign for convenience even if stored in any of the factory A data collection server 3 (or the factory B data collection server 4), the data lake server 2, and the storage 13 of the analysis management server 10.

The management table 15 is a table created by processing. The management table 15 includes an undetected correspondence table 151, a detected correspondence table 152, an extracted correspondence table 153, and an unresolved correspondence table 154 (see FIG. 8). The table group 16 is a table group necessary for processing out of the table groups 22 of the data lake server 2. In the present embodiment, the table group 16 includes the application source analysis data correspondence table 39. In the present embodiment, tables having the same content are denoted by the same reference sign for convenience even if stored in any of the factory A data collection server 3 (or the factory B data collection server 4), the data lake server 2, and the storage 13 of the analysis management server 10.

Figure 2:
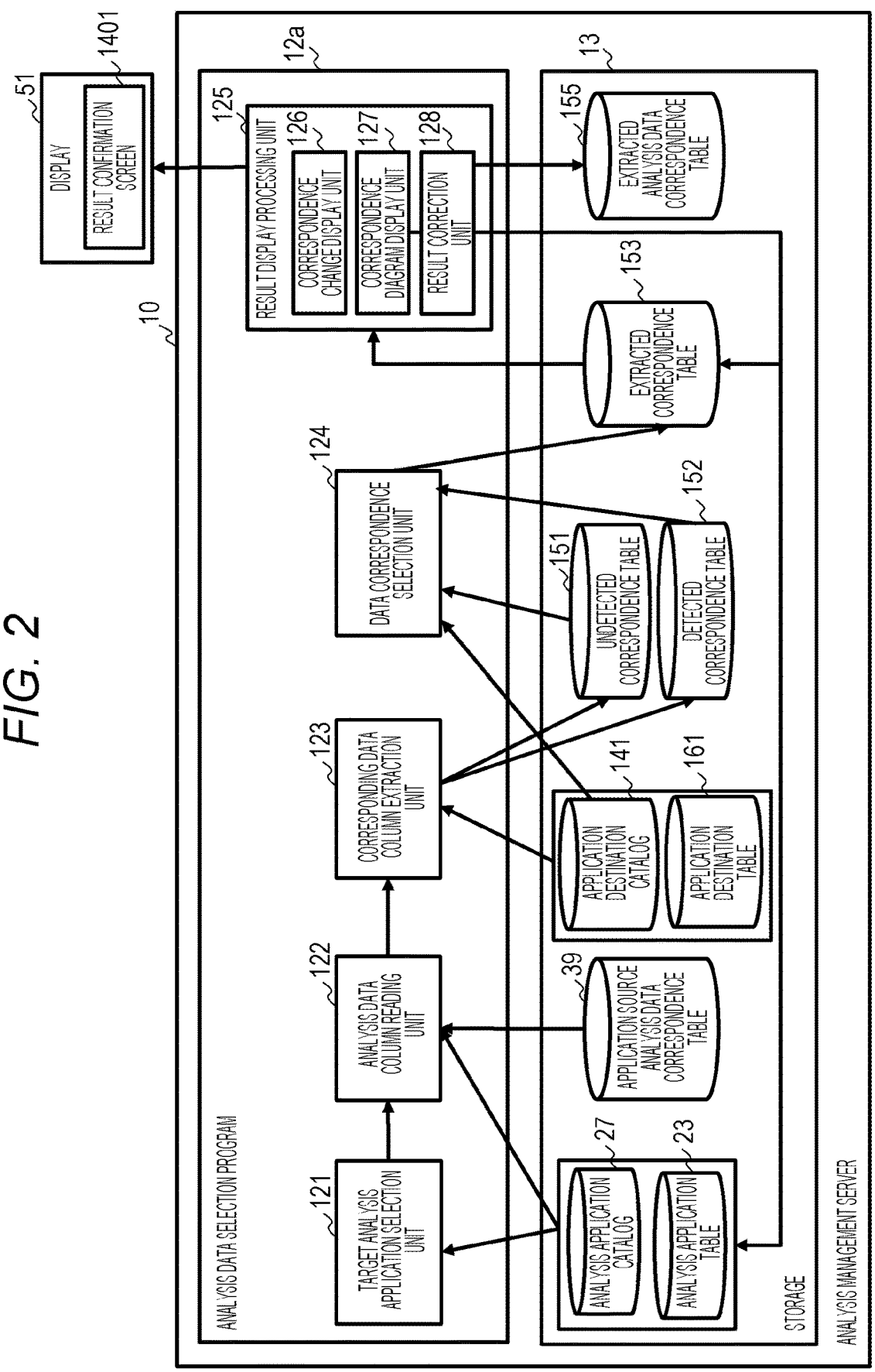
FIG. 2 is a functional configuration diagram of an analysis management server according to the embodiment.

FIG. 2 is a functional configuration diagram of the analysis management server according to the embodiment.

As the CPU 11 executes the analysis data selection program 12a in the analysis management server 10, a target analysis application selection unit 121, an analysis data column reading unit 122, a corresponding data column extraction unit 123, a data correspondence selection unit 124, and a result display processing unit 125 are formed. The result display processing unit 125 includes a correspondence change display unit 126, a correspondence diagram display unit 127, and a result correction unit 128.

The target analysis application selection unit 121 receives selection of an analysis application which is a target set by a user from the analysis application table 23.

The analysis data column reading unit 122 reads a column which is a connection target in an entry corresponding to the target analysis application from the analysis application table 23. In addition, the analysis data column reading unit 122 reads the application source analysis data correspondence table 39.

The corresponding data column extraction unit 123 acquires a catalog (application destination catalog: corresponding to the factory B catalog group 29) 141 of the application destination (factory B), extracts a catalog for which a catalog having an identical correspondence exists in the application destination and a catalog for which the catalog having the identical correspondence does not exist in the application destination from the application source analysis data correspondence table 39, further extracts a catalog that is not to be connected at the application destination in order to pass through the catalog that does not exist, and generates the undetected correspondence table 151 and the detected correspondence table 152 based on the extraction result.

The data correspondence selection unit 124 searches the application destination catalog 141 based on the catalog that does not exist or the catalog not to be connected, which has been registered in the undetected correspondence table 151 to extract a correspondence of a catalog of a table connectable to a column of the defect factor analysis table 24, and outputs the extracted correspondence to the extracted correspondence table 153.

Figure 14:
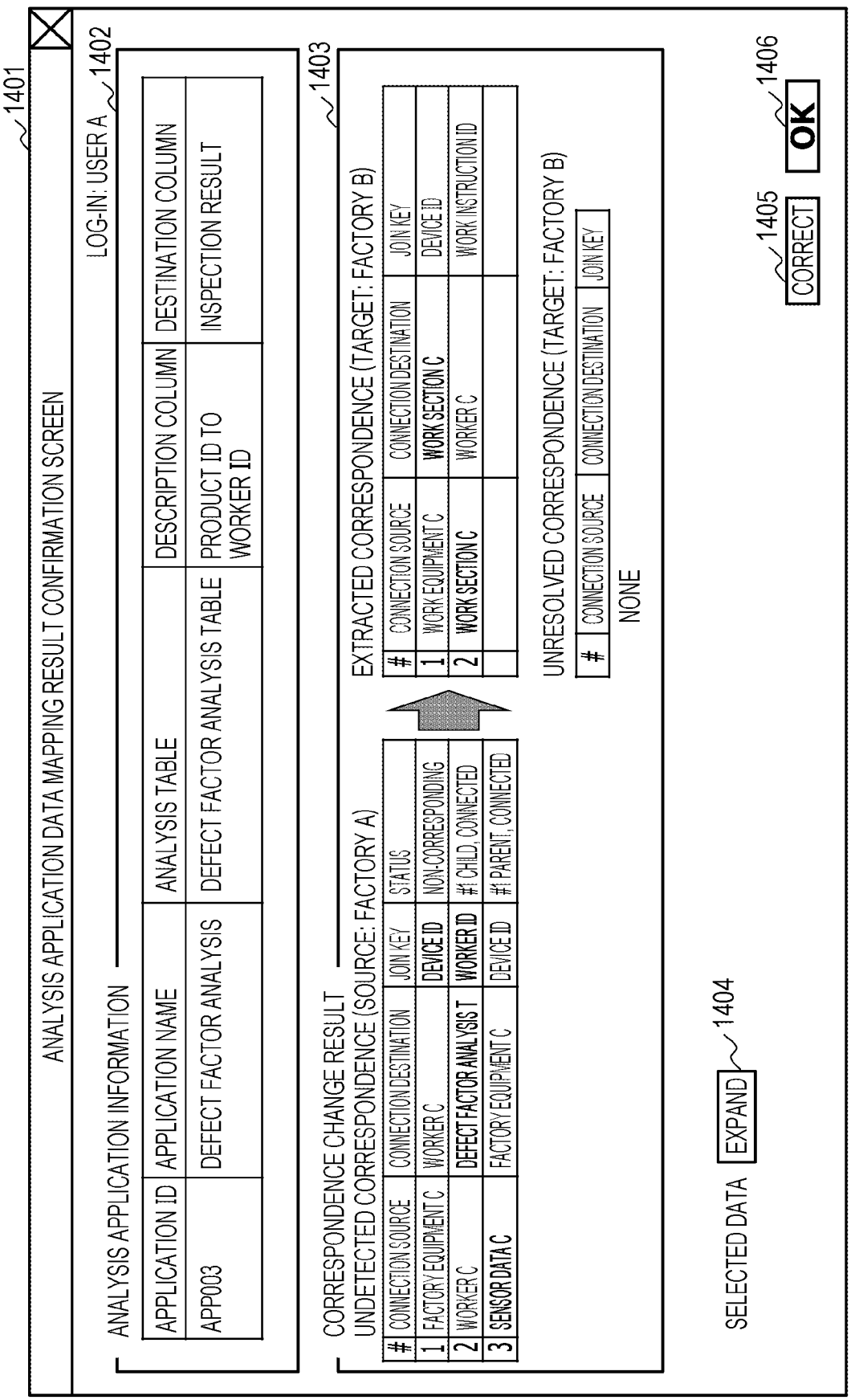
FIG. 14 is a diagram illustrating an analysis application data result confirmation screen according to the embodiment.

The result display processing unit 125 outputs a result, obtained based on information included in the undetected correspondence table 151, the detected correspondence table 152, and the extracted correspondence table 153, to the display 51 as a result confirmation screen 1401 (see FIG. 14). The correspondence change display unit 126 displays a correspondence between a column of the defect factor analysis table 24 and data of a table before extracting a correspondence of a connectable table (catalog) and a correspondence between a column of the defect factor analysis table 24 including the extracted correspondence and a table. The correspondence diagram display unit 127 displays and outputs a diagram illustrating a correspondence between a column of the defect factor analysis table 24 and data of a table, for example, a diagram illustrating a connection relationship between a column of the defect factor analysis table 24 and a catalog of a table having a correspondence. The result correction unit 128 outputs the extracted analysis data correspondence table 155 (see FIG. 9) based on the detected correspondence table 152 and the extracted correspondence table 153. In addition, the result correction unit 128 receives an instruction for correction of a correspondence between a column of the defect factor analysis table 24 and data of a table from a user, and corrects the correspondence between the columns of the defect factor analysis table 24 and the data of the table in response to the instruction, and corrects the extracted analysis data correspondence table 155. Incidentally, the result display processing unit 125 may create the defect factor analysis table 24 for the factory B from the table of the factory B table group 26 based on the extracted analysis data correspondence table 155. The result display processing unit 125 may transmit the created defect factor analysis table 24 for the factory B to the analysis application execution server 5 so as to execute analysis processing by an analysis application using the defect factor analysis table 24.

FIG. 3 is a configuration diagram of a table and a catalog relating to the factory A, a table and a catalog of an analysis application, and the defect factor analysis table according to the embodiment.

The analysis application table 23 stores an entry for each application provided by the analysis application execution server 5. The entries of the analysis application table 23 include columns such as an application ID, an application name, an analysis table, a description column, and a destination column. The application ID stores an ID of an application. The application name stores a name of an application. The analysis table stores a name of a table which is an analysis target of the analysis application. The description column stores a column name of a column for data relating to a cause among pieces of data as inputs of the analysis application. The destination column stores a column name of a column for data relating to a result among pieces of data as inputs of the analysis application. That is, the analysis application analyzes the relationship between the column of the target column and the column of the description column other than the target column. The analysis application table 23 includes the description column and the destination column, but does not necessarily include these columns, for example, when a processing target has been set to be the entire data in the analysis table or specific data.

The analysis application catalog 27 includes names of columns constituting the analysis application table 23 and attributes of the columns.

The defect factor analysis table 24 stores an entry for each produced product. The entries of the defect factor analysis table 24 include columns such as a product ID, a factory ID, a process ID, a device ID, a manufacturing date and time (a manufacturing date, a process start time, and a process completion time), a sensor data table ID, a worker ID, and an inspection result. The product ID stores an ID of a product (product ID). For example, the product ID is assigned not for each individual but in common if products are the same. The factory ID stores an ID of a factory that has manufactured a product corresponding to an entry. The process ID stores an ID of a process in which a product corresponding to an entry has been manufactured. The manufacturing date and time stores a manufacturing date and time (a manufacturing date, a process start time, and a process completion time) of a product corresponding to an entry. The sensor data table ID stores an ID indicating a sensor data table storing sensor information at the time of manufacturing a product corresponding to an entry. Although the sensor data table ID is stored such that actual sensor data can be referred to in the present embodiment, the sensor data itself may be stored in the defect factor analysis table 24. The worker ID stores an ID of a worker who has manufactured a product corresponding to an entry. The inspection result stores an inspection result of a product corresponding to an entry.

The sensor data table 35 is a table that stores sensor data. Each of the sensor data tables 35 is managed so as to be identifiable with the sensor data table ID. Entries of the sensor data table 35 include columns such as a device ID, a component ID, a sensor type, a measurement time, and sensor data. The device ID stores a device ID of a device in which sensor data corresponding to an entry has been detected. The component ID stores a component ID of a component for which sensor data has been detected. The sensor type stores a type of sensor data. The measurement time stores a time when sensor data was measured. The sensor data stores sensor data that has been measured.

The sensor data catalog 301 includes names of columns constituting the sensor data table 35, attributes of the columns, units, periods, and types. Incidentally, the unit, period, and type store metadata information (such as an ontology) for a sensor that is not stored in the sensor data table 35.

The factory equipment catalog 302 includes names of columns constituting the factory equipment table 37 and attributes of the columns. Examples of the columns constituting the factory equipment table 37 include a factory ID, a process ID, a work section ID, an equipment ID, and a device ID.

The inspection result catalog 303 includes names of columns constituting the inspection result table 36 and attributes of the columns. Examples of the columns constituting the inspection result table 36 include a product ID, a manufacturing date and time, an inspection result, and a defect factor.

The worker catalog 305 includes names of columns constituting the worker table 38 and attributes of the columns. Examples of the columns constituting the worker table 38 include a device ID, a worker ID, and a work date and time.

The component catalog 306 includes names of columns constituting the component table 34 and attributes of the columns. Examples of the columns constituting the component table 34 include a product ID, a product name, and a component ID.

Figure 4:
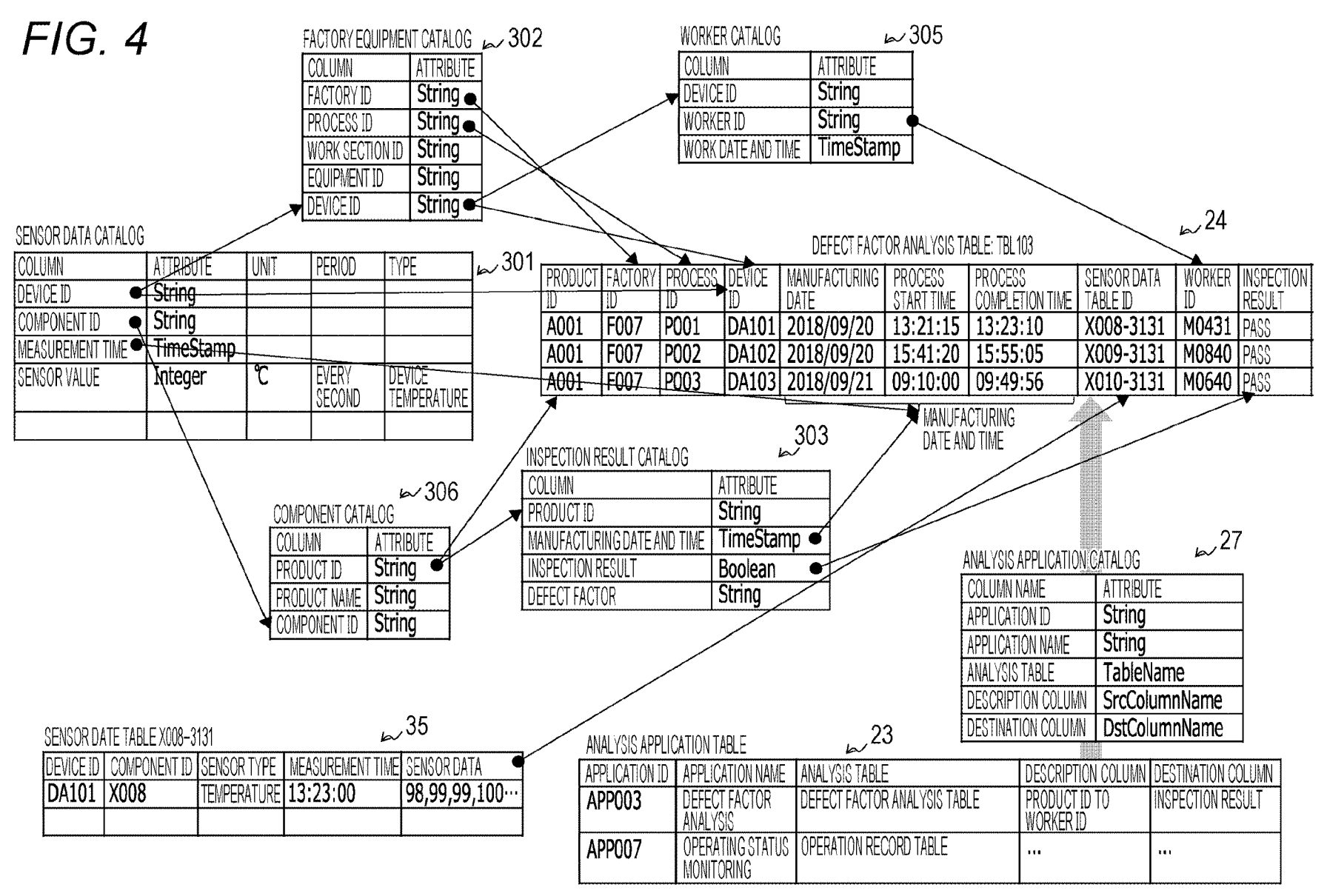

FIG. 4 is a diagram illustrating a correspondence between a table and a catalog relating to the factory A and the defect factor analysis table according to the embodiment.

It is understood that the component ID of the sensor data catalog 301 can be connected to the component ID of the component catalog 306 (there is a correspondence), and the product ID of the component catalog 306 can be connected to the product ID of the defect factor analysis table 24. This means that the component table 34 is searched using the component ID of the sensor data table 35 as a key so that a value of the product ID of an entry of a search result can be used as a value of the product ID of the defect factor analysis table 24.

In addition, it is understood that the device ID of the sensor data catalog 301 can be connected to the device ID of the factory equipment catalog 302, and the factory ID, the process ID, and the device ID in the factory equipment catalog 302 correspond to the factory ID, the process ID, and the device ID in the defect factor analysis table 24. This means that the factory equipment table 37 is searched using the device ID of the sensor data table 35 as a key so that values of the factory ID, the process ID, and the device ID of an entry of a search result can be used as values of the factory ID, the process ID, and the device ID in the defect factor analysis table 24.

In addition, it is understood that the component ID of the sensor data catalog 301 can be connected to the component ID of the component catalog 306 (there is a correspondence), the product ID of the component catalog 306 can be connected to the product ID of the inspection result catalog 303, and the manufacturing date and time and the inspection result in the inspection result catalog 303 can be connected to the manufacturing date and time (the manufacturing date, the process start time, and the process completion time) and the inspection result in the defect factor analysis table 24. This means that the component table 34 is searched using a value of the component ID of the sensor data table 35 as a key and the search result table 36 is searched using a value of the product ID of an entry of a search result as a key so that values of a manufacturing date and time of the entry of the search result and the search result can be used as values of the manufacturing date and time (the manufacturing date, the process start time, and the process completion time) and the inspection result of the defect factor analysis table 24.

In addition, it is understood that the device ID of the sensor data catalog 301 can be connected to the device ID of the defect factor analysis table 24, and the measurement time of the sensor data catalog 301 is associated with the manufacturing date and time of the defect factor analysis table 24. The association can be made if the measurement time is between the process start time and the process completion time of the manufacturing date and time. This means that a value of the sensor data table 35 can be used as a value of the defect factor analysis table 24 using the device ID and the measurement time in the sensor data table 35 as keys.

In addition, this also means that a table ID (for example, X008-3131) of the sensor data table 35 can be used as a value of the sensor data table ID of the defect factor analysis table 24.

In addition, it is understood that the device ID of the sensor data catalog 301 can be connected to the device ID of the factory equipment catalog 302, the device ID of the factory equipment catalog 302 can be connected to the device ID of the worker catalog 305, and the worker ID of the worker catalog 305 can be connected to the worker ID of the defect factor analysis table 24. This means that the factory equipment table 37 is searched using the device ID of the sensor data table 35 as a key and the worker table 38 is searched using the device ID of an entry of a search result as a key so that a value of the worker ID of the entry of the search result can be used as a value of the worker ID in the defect factor analysis table 24.

FIG. 5 is a configuration diagram of the application source analysis data correspondence table of the factory A according to the embodiment. In FIG. 5, C represents a catalog, and T represents a table.

The application source analysis data correspondence table 39 shows a correspondence between the sensor data table 35 at the application source (the factory A in FIG. 5) and analysis data (the defect factor analysis table 24), that is, the correspondence used to generate the defect factor analysis table 24 from the sensor data table 35.

Specifically, the application source analysis data correspondence table 39 includes entries indicating the respective correspondences of catalogs and tables illustrated in FIG. 4. The entries include a connection source (a catalog name or a table name as the connection source), a connection destination (a catalog name or a table name as the connection destination), and a join key (column name) that joins the connection source and the connection destination.

The application source analysis data correspondence table 39 may be set by a system or set by a user based on the catalog and table configurations.

FIG. 6 is a configuration diagram of a table and a catalog relating to the factory B and a table and a catalog of an analysis application according to the embodiment. Incidentally, those who are the same as the tables and catalogs illustrated in FIG. 4 are denoted by the same reference signs, and the redundant description thereof is omitted.

The sensor data table 45 is a table that stores sensor data in the factory B. Each of the sensor data tables 45 is managed so as to be identifiable with the sensor data table ID. Entries of the sensor data table 45 include columns such as a device ID, a component ID, a sensor type, a measurement time, and sensor data. The device ID stores a device ID of a device in which sensor data corresponding to an entry has been detected. The component ID stores a component ID of a component for which sensor data has been detected. The sensor type stores a type of sensor data. The measurement time stores a time when sensor data was measured. The sensor data stores sensor data that has been measured.

The sensor data catalog 401 includes names of columns constituting the sensor data table 45, attributes of the columns, units, periods, and types. Incidentally, the unit, period, and type store metadata information (such as an ontology) for a sensor that is not stored in the sensor data table 45.

The factory equipment catalog 402 includes names of columns constituting the factory equipment table 47 and attributes of the columns. Examples of the columns constituting the factory equipment table 47 include a factory ID, a process ID, a work section ID, an equipment ID, and a device ID.

The inspection result catalog 403 includes names of columns constituting the inspection result table 46 and attributes of the columns. Examples of the columns constituting the inspection result table 46 include a product ID, a manufacturing date and time, an inspection result, and a defect factor.

The worker catalog 405 includes names of columns constituting the worker table 48 and attributes of the columns. Examples of the columns constituting the worker table 48 include a work instruction ID, a worker ID, and a work date and time. In the present embodiment, the worker table 48 is different from the worker table 38 in the factory A in terms of the column configuration.

The component catalog 406 includes names of columns constituting the component table 44 and attributes of the columns. Examples of the columns constituting the component table 44 include a product ID, a product name, and a component ID.

The work section catalog 407 includes names of columns constituting the work section table 49 and attributes of the columns. Examples of the columns constituting the work section table 49 include a work instruction ID, work section ID, a start date and time, a quantity, a production record, and a device ID. In the present embodiment, there is no table having the same configuration as the work section table 49 in the factory A.

Figure 7:
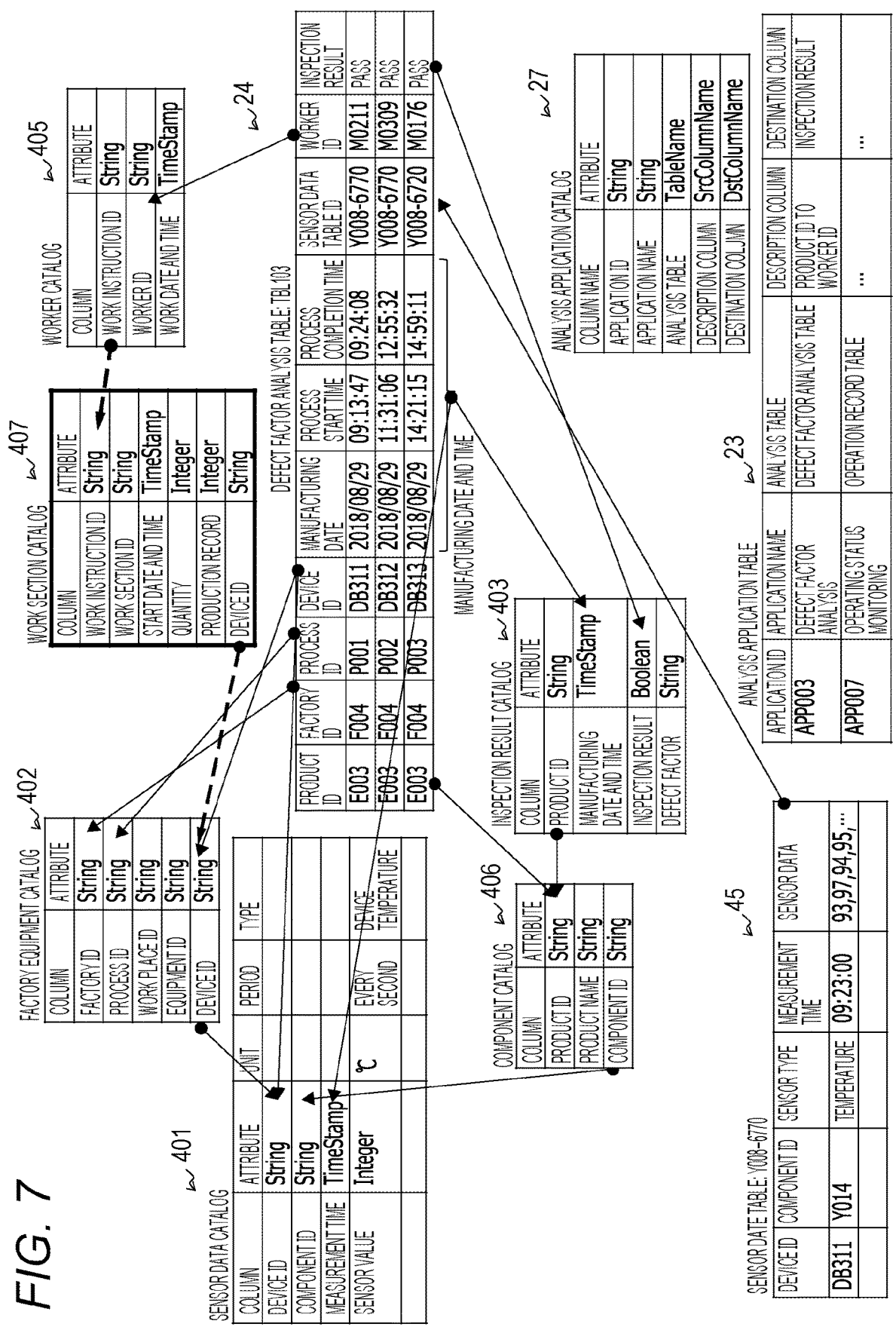
FIG. 7 is a diagram illustrating a correspondence between the table and the catalog relating to the factory B and the defect factor analysis table according to the embodiment.

FIG. 7 is a diagram illustrating a correspondence between a table and a catalog relating to the factory B and the defect factor analysis table according to the embodiment. Incidentally, the solid arrow illustrated in FIG. 7 indicates a correspondence identified by the application source analysis data correspondence table 39 through processing to be described later, and the broken arrow indicates a correspondence extracted based on data of a catalog of the factory B through processing to be described later.

It is understood that the component ID of the sensor data catalog 401 can be connected to the component ID of the component catalog 406 (there is a correspondence), and the product ID of the component catalog 406 can be connected to the product ID of the defect factor analysis table 24. This means that the component table 44 is searched using the component ID of the sensor data table 45 as a key so that a value of the product ID of an entry of a search result can be used as a value of the product ID of the defect factor analysis table 24.

In addition, it is understood that the device ID of the sensor data catalog 401 can be connected to the device ID of the factory equipment catalog 402, and the factory ID, the process ID, and the device ID in the factory equipment catalog 402 correspond to the factory ID, the process ID, and the device ID in the defect factor analysis table 24. This means that the factory equipment table 47 is searched using the device ID of the sensor data table 45 as a key so that values of the factory ID, the process ID, and the device ID of an entry of a search result can be used as values of the factory ID, the process ID, and the device ID in the defect factor analysis table 24.

In addition, it is understood that the component ID of the sensor data catalog 401 can be connected to the component ID of the component catalog 406 (there is a correspondence), the product ID of the component catalog 406 can be connected to the product ID of the inspection result catalog 403, and the manufacturing date and time and the inspection result in the inspection result catalog 403 can be connected to the manufacturing date and time (the manufacturing date, the process start time, and the process completion time) and the inspection result in the defect factor analysis table 24. This means that the component catalog 44 is searched using a value of the component ID of the sensor data table 45 as a key and the search result table 46 is searched using a value of the product ID of an entry of a search result as a key so that values of a manufacturing date and time of the entry of the search result and the search result can be used as values of the manufacturing date and time (the manufacturing date, the process start time, and the process completion time) and the inspection result of the defect factor analysis table 24.

In addition, this also means that a table ID (for example, Y008-6770) of the sensor data table 45 can be used as a value of the sensor data table ID of the defect factor analysis table 24.

The device ID of the sensor data catalog 401 can be connected to the device ID of the factory equipment catalog 402. The worker ID of the worker catalog 405 can be connected to the worker ID of the defect factor analysis table 24. However, the device ID is not included in the worker catalog 405 in the factory B, and is not connectable to the device ID in the factory equipment catalog 402. Therefore, it is difficult to set a value of the worker ID of the defect factor analysis table 24 in the factory B only by using the application source analysis data correspondence table 39.

In addition, the device ID of the sensor data catalog 401 can be connected to the device ID of the factory equipment catalog 402, the device ID of the factory equipment catalog 402 can be connected to the device ID of the work section catalog 407, the work instruction ID of the work section catalog 407 can be connected to the work instruction ID of the worker catalog 405, and the worker ID of the worker catalog 405 can be connected to the worker ID of the defect factor analysis table 24. Such a connection relationship between the columns is the relationship extracted by processing to be described later, and cannot be grasped from the application source analysis data correspondence table 39. According to this correspondence, the factory equipment table 47 is searched using the device ID of the sensor data table 45 as a key, the work section table 49 is searched using the device ID of the search result entry as a key, and the worker table 48 is searched using the value of the work instruction ID of an entry of a search result as a key so that a value of the worker ID in the entry of the search result can be used as a value of the worker ID in the defect factor analysis table 24.

FIG. 8 is a configuration diagram of the management table according to the embodiment.

The management table 15 includes the undetected correspondence table 151, the detected correspondence table 152, the extracted correspondence table 153, and the unresolved correspondence table 154.

The undetected correspondence table 151 is a table to manage an entry corresponding to each correspondence existing on a path of a correspondence that is not connected from a column of the sensor data catalog 401 to a column of the defect factor analysis table 24 among correspondences of the application source analysis data correspondence table 39. The entries of the undetected correspondence table 151 include a connection source, a connection destination, a join key, and an extraction state.

The connection source is a catalog name or a table name that serves as a connection source. The connection destination is a catalog name or a table name that serves as a connection destination. The join key is a join key (column name) that joins the connection source and the connection destination. The extraction state is a state of a correspondence corresponding to an entry. The extraction states include "non-corresponding" indicating that there is no correspondence corresponding to an entry and no correspondence has been detected, "connected" indicating that a connection source or a connection destination of the correspondence corresponding to an entry is connected to the sensor data table or the analysis data (defect factor analysis table 24), and "unconnected" indicating that a connection source or a connection destination of a correspondence corresponding to an entry is not connected to the sensor data table and the analysis data (defect factor analysis table 24). In addition, in the extraction state, a parent-child relationship with another correspondence (here, the sensor data table (sensor data catalog) side is a higher order (parent side), and the defect factor analysis table 24 side is a lower order (child side). For example, "#1 child" of the second entry indicates that a correspondence of this entry is a correspondence that is a child of #1 (first entry), that is, the correspondence connected to the connection destination.

The detected correspondence table 152 is a table to manage an entry corresponding to each correspondence existing on a path of a correspondence that is connected from a column of the sensor data catalog 401 (sensor data table 35) to a column of the defect factor analysis table 24 among correspondences of the application source analysis data correspondence table 39. The entries of the detected correspondence table 152 include a connection source, a connection destination, and a join key.

The extracted correspondence table 153 is a table to manage an entry corresponding to a correspondence extracted as a connection from a column of the sensor data catalog 401 (sensor 24 data table 35) to a column of the defect factor analysis table regarding a correspondence that is not connected from a column of the sensor data catalog 401 to a column of the defect factor analysis table 24. The entries of the extracted correspondence table 153 include a connection source, a connection destination, and a join key.

The unresolved correspondence table 154 is a table to manage an entry corresponding to a correspondence for which no correspondence to be connected has been found regarding a correspondence that is not connected from a column of the sensor data catalog 401 to a column of the defect factor analysis table 24. The entries of the unresolved correspondence table 154 include a connection source, a connection destination, and a join key.

FIG. 9 is a configuration diagram of an extracted analysis data correspondence table for the factory B according to the embodiment.

In FIG. 9, C represents a catalog, and T represents a table.

The extracted analysis data correspondence table 155 shows a correspondence between the sensor data table 45 at the application destination (the factory B in the present embodiment) and the analysis data (defect factor analysis table 24), that is, the correspondence used to generate the defect factor analysis table 24 from the sensor data table 45.

The extracted analysis data correspondence table 155 is an example of second correspondence information.

Specifically, the extracted analysis data correspondence table 155 includes entries indicating the respective connection relationships of catalogs and tables illustrated in FIG. 7. The entries include a connection source, a connection destination, and a join key that joins the connection source and the connection destination.

Next, data selection processing performed by the analysis management server 10 will be described.

Figure 10:
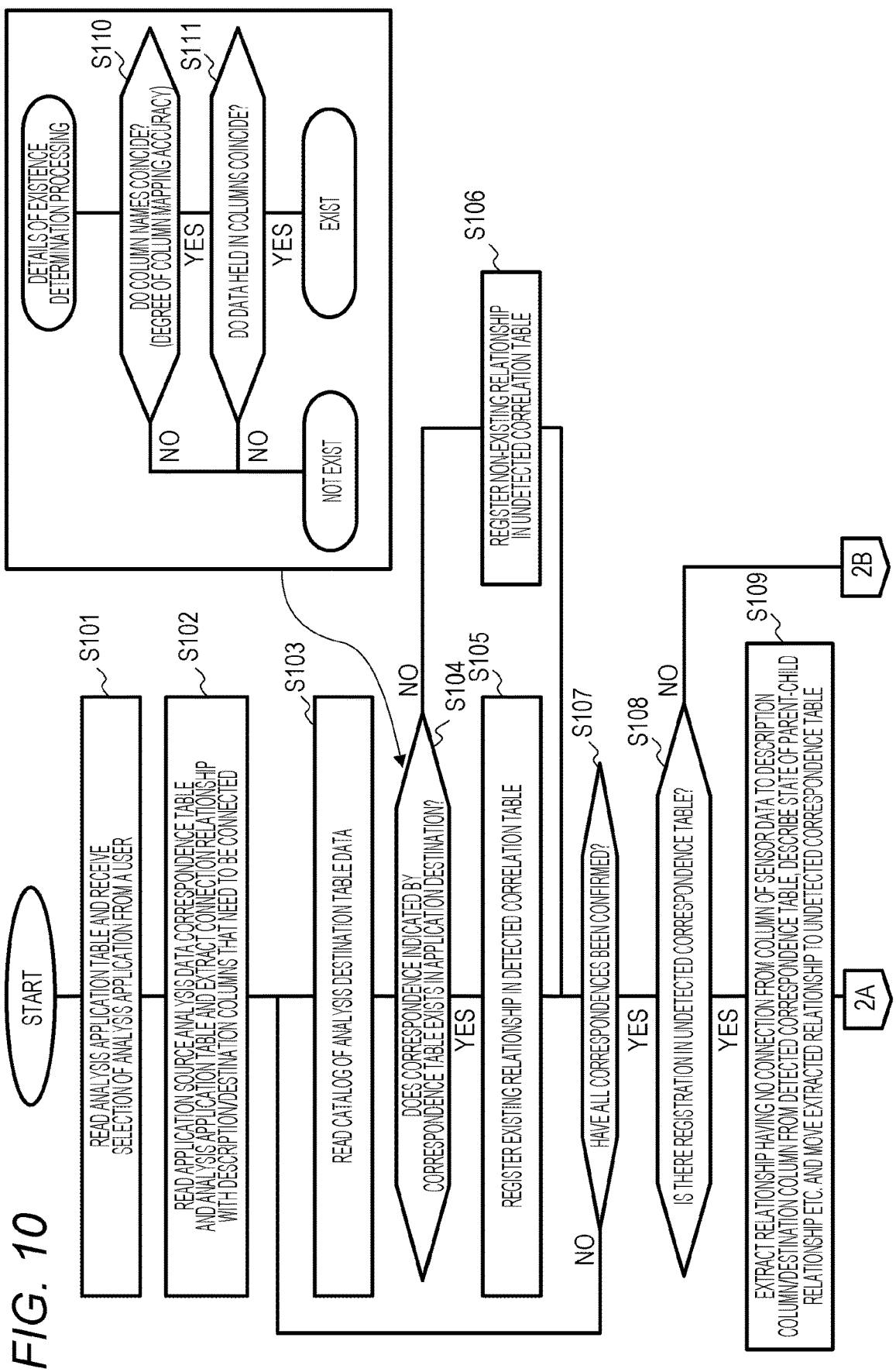
FIG. 10 is a first flowchart of data selection processing according to the embodiment.
Figure 11:
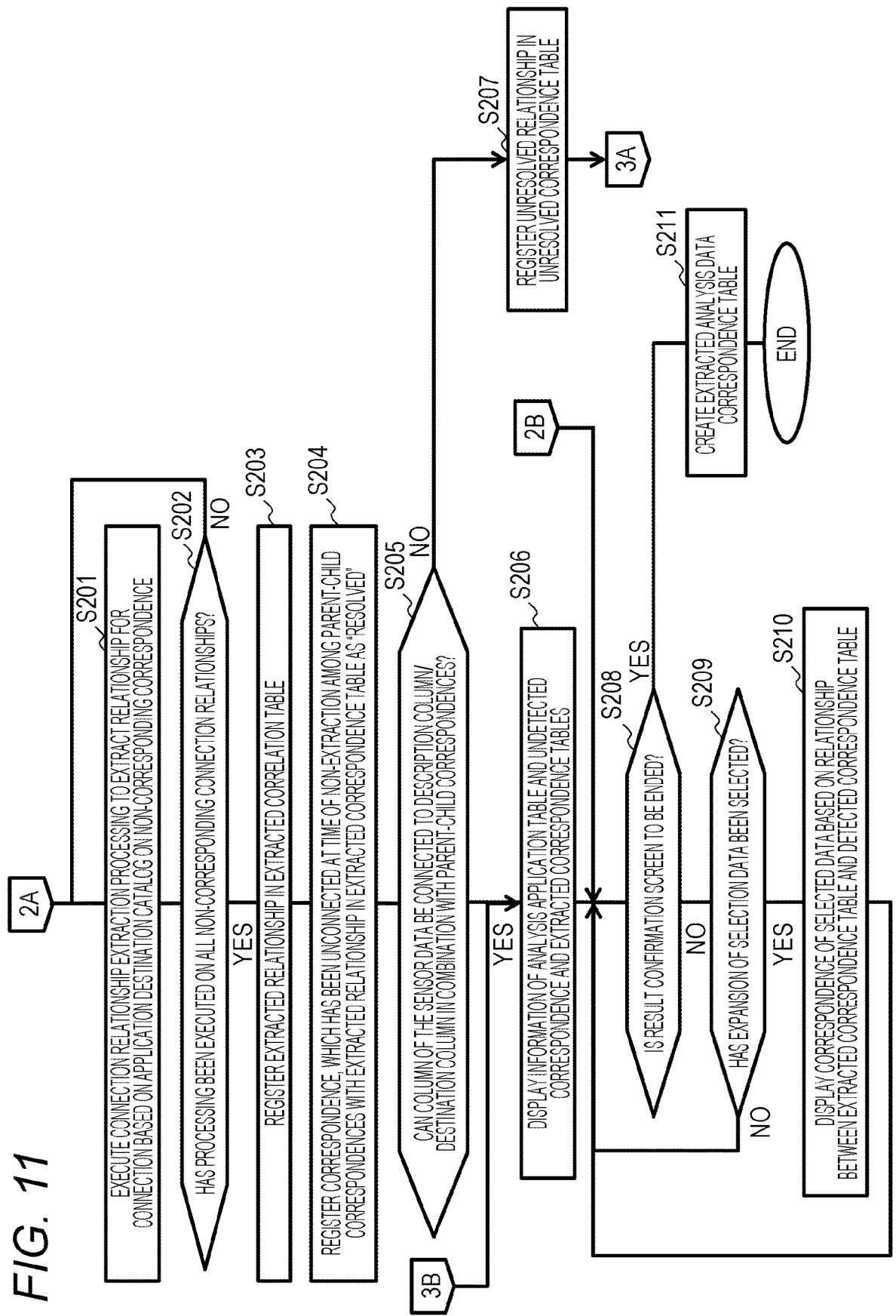
FIG. 11 is a second flowchart of the data selection processing according to the embodiment.
Figure 12:
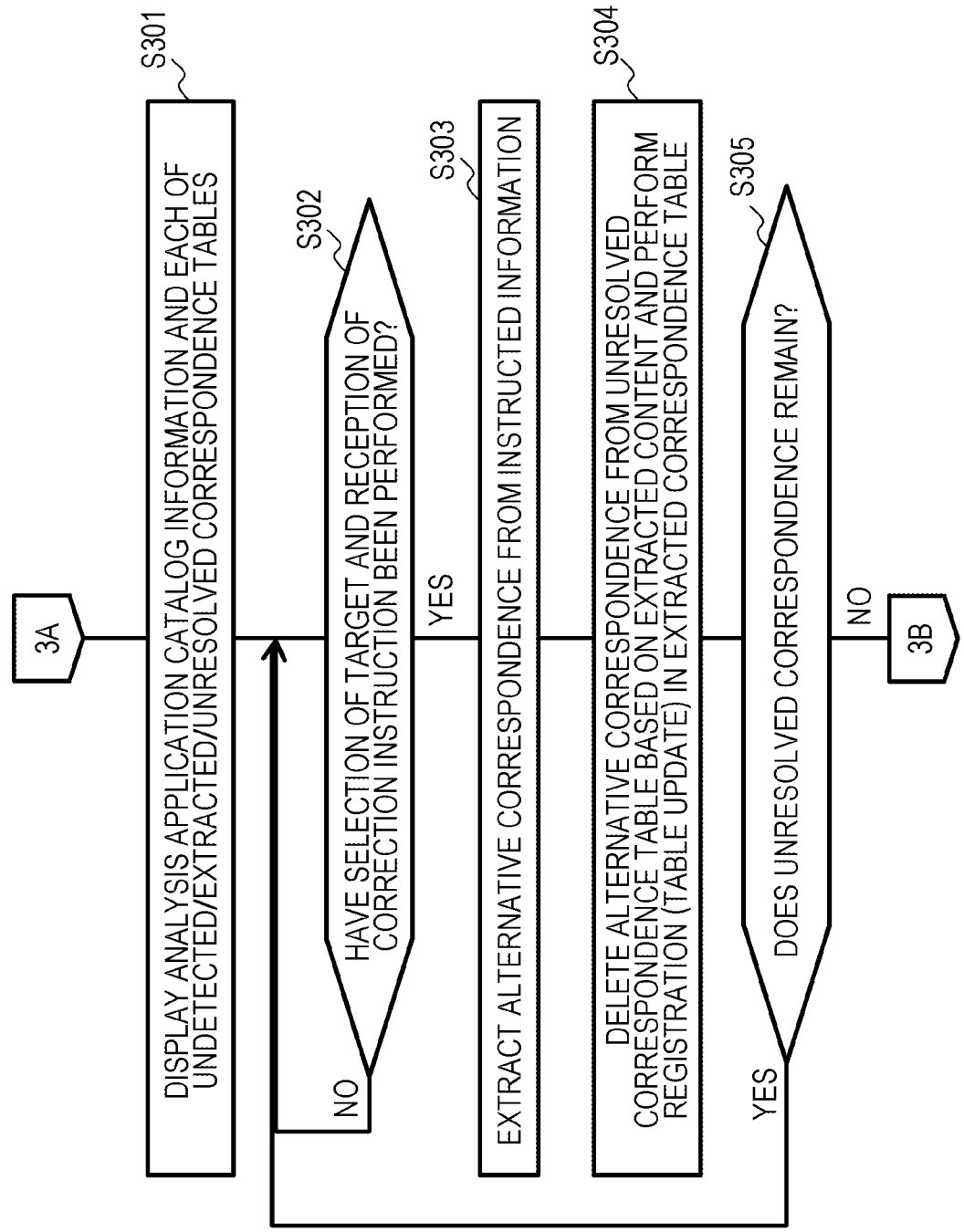
FIG. 12 is a third flowchart of the data selection processing according to the embodiment.

FIG. 10 is a first flowchart of the data selection processing according to the embodiment, FIG. 11 is a second flowchart of the data selection processing according to the embodiment, and FIG. 12 is a third flowchart of the data selection processing according to the embodiment.

First, the target analysis application selection unit 121 of the analysis management server 10 reads the analysis application table 23, displays information of analysis applications so as to be selectable based on the analysis application table 23, and receives selection of an analysis application as a processing target from the user (S101).

Next, the analysis data column reading unit 122 reads the analysis application table 23 to extract a description column and a destination column of the selected analysis application, and further reads the application source analysis data correspondence table 39 to extract a connection relationship (S102).

Next, the corresponding data column extraction unit 123 reads a catalog group (factory B catalog group: each catalog is referred to as an application destination catalog) corresponding to table data of an application destination (the factory B in this example) (S103).

Next, the corresponding data column extraction unit 123 determines whether a correspondence identical to a correspondence in the application source analysis data correspondence table 39 exists in the application destination (S104). Here, the correspondence includes a connection source catalog (or table), a connection destination catalog (or table), and a join key. Therefore, it is determined in Step S104 whether a catalog corresponding to the connection source catalog exists in the application destination, whether a catalog corresponding to the connection destination catalog exists in the application destination, and whether the join key coincides with a join key between catalogs of the application destination. Here, a catalog that is the corresponding catalog in the application destination and does not have a join key is an unconnected catalog.

In existence determination processing of determining whether a corresponding catalog in a correspondence exists, the corresponding data column extraction unit 123 determines whether column names coincide between a catalog of the application source and a catalog of the application destination (S110). Here, the column names may be determined to coincide not only when both the column names completely coincide but also when a degree of accuracy (column mapping accuracy) of columns whose names coincide relative to the total number of columns in a catalog is equal to or higher than a predetermined value.

As a result, when the column names do not coincide (S110: No), the corresponding data column extraction unit 123 determines that a corresponding catalog does not exist. On the other hand, when the column names coincide (S110: Yes), the corresponding data column extraction unit 123 refers to a table corresponding to the catalog, and determines whether data stored in the columns coincide (S111).

As a result, when the data stored in the columns do not coincide (S111: No), the corresponding data column extraction unit 123 determines that a corresponding catalog does not exist. On the other hand, when the data stored in the columns coincide (S111: Yes), the corresponding data column extraction unit 123 determines that a corresponding catalog exists.

When the correspondence identical to the correspondence of the application source analysis data correspondence table 39 exists in the application destination (S104: Yes) as a result of the determination in Step S104, the corresponding data column extraction unit 123 registers an entry of the correspondence in the detected correspondence table 152, and advances the processing to Step S107.

On the other hand, when the correspondence in the application source analysis data correspondence table 39 does not exist in the application destination (S104: No), the corresponding data column extraction unit 123 registers the entry of the correspondence in the undetected correspondence table 151, and advances the processing to Step S107. Here, a device ID does not exist in the worker catalog 405 of the factory B in the present embodiment, and thus, the 87th entry of the undetected correspondence table 39 in FIG. 5 corresponds to a correspondence (unconnected correspondence) that does not exist in the application destination.

In Step S107, the corresponding data column extraction unit 123 determines whether all correspondences in the application source analysis data correspondence table 39 have been confirmed, and advances the processing to Step S103 to confirm another correspondence when not all the correspondences have been confirmed (S107: No), and advances the processing to Step S108 when all the correspondences have been confirmed (S107: Yes).

In Step S108, the data correspondence selection unit 124 determines whether an entry is registered in the undetected correspondence table 151.

As a result, a case where there is no entry registered in the undetected correspondence table 151 (S108: No) means that all correspondences between necessary columns for each column of the defect factor analysis table 24 and data for acquisition of a value of the column have been prepared, that is, the defect factor analysis table 24 can be generated, and thus, the data correspondence selection unit 124 advances the processing to Step S208 (FIG. 11).

On the other hand, when the entry is registered in the undetected correspondence table 151 (S108: Yes), the data correspondence selection unit 124 extracts an entry of another correspondence (identical path correspondence) constituting a connection path including a correspondence to which the correspondence connected from the column of the sensor data table 45 to the columns of the description column and the destination column of the defect factor analysis table 201 is not connected, in other words, an unconnected correspondence from the column of the sensor data table 45 to the columns of the description column and the destination column of the defect factor analysis table 201 from the detected correspondence table 152 based on the correspondence (unconnected correspondence) indicated by the entry registered in the undetected correspondence table 124, and moves the extracted entry to the undetected correspondence table 151. At this time, the data correspondence selection unit 124 identifies information such as a parent-child relationship between this correspondence and the unconnected correspondence, causes the identified information to be included in this entry, and advances the processing to Step S201. Here, when an entry of #1 of the undetected correspondence table 151 illustrated in FIG. 5 is registered in the present embodiment, entries in a connection relationship that connect a catalog (worker catalog) of a connection destination of this entry and the defect factor analysis table 24 (entries corresponding to the first and eighth rows of the application source analysis data correspondence table 39) are registered as entries of #2 and #3 in the undetected correspondence table 151 of FIG. 8.

In Step S201, the data correspondence selection unit 124 executes connection relationship extraction processing (see FIG. 13) configured to extract a relationship of a connection based on a catalog of the application destination (in this example, the factory B) for a non-corresponding correspondence in the undetected correspondence table 151.

Next, the data correspondence selection unit 124 determines whether the connection relation extraction processing has been executed for all non-corresponding connection relationships, advances the processing to Step S201 to execute the connection relationship extraction processing for an unprocessed non-corresponding connection relationship when the connection relationship extraction processing has not been executed for all the non-corresponding connection relationships (S202: No).

On the other hand, when the connection relationship extraction processing has been executed for all the non-corresponding connection relationships (S202: Yes), the data correspondence selection unit 124 registers the relationship extracted through the connection relationship extraction processing in the extracted correspondence table 153 (S203).

Next, the data correspondence selection unit 124 registers a correspondence that has been unconnected at the time of non-extraction (before the connection relationship extraction processing) from among parent-child correspondences with the extracted relationship in the extracted correspondence table 153 as "resolved" (S204).

Next, the data correspondence selection unit 124 determines whether the column of the sensor data can be connected to the description column and the destination column by combining the extracted relationship and the parent-child correspondences (S205).

As a result, when the connection can be made from the column of the sensor data to the description column and the destination column (S205: Yes) or in the case of Yes in Step S305, which will be described later, the result display processing unit 125 displays a result confirmation screen (for example, the analysis application data mapping result confirmation screen 1401 (see FIG. 14)) including the information on the target analysis application of the analysis application table 23, the undetected correspondence table 151, and the extracted correspondence table 153 (S206). As a result, the user can easily grasp the correspondence that is unconnected and the correspondence newly extracted for the connection at the application destination. As a result, it is possible to grasp whether the extracted correspondence is appropriate. In addition, it is possible to grasp the catalog itself having the correspondence that is unconnected and another catalog that is affected by the unconnected correspondence from the contents of the undetected correspondence table. When it is possible to grasp the other catalog that is affected by the unconnected correspondence, for example, the user can search for a new correspondence to connect the column of the sensor data to the description column and the destination column using this catalog as a start point.

Next, the result display processing unit 125 determines whether an instruction to end the result confirmation screen has been received from the user (S208), and, when receiving the instruction to end (S208: Yes), creates the extracted analysis data correspondence table 155 including all the entries of the detected correspondence table 152 and the extracted correspondence table 153 (S211) and ends the data selection processing.

On the other hand, when the instruction to end the result confirmation screen has not been received from the user (S208: No), the result display processing unit 125 determines whether the expansion of selected data has been selected by the user on the result confirmation screen (S209), and advances the processing to Step S208 when the expansion of the selected data has not been selected by the user (S209: No). On the other hand, when the expansion of the selected data has been selected by the user (S209: Yes), the extracted data display unit 127 displays a result confirmation screen (for example, an analysis application data selection result display screen 1501 (see FIG. 15)) including a correspondence diagram showing a correspondence between the sensor data and the column of the defect factor analysis table 24 based on correspondences indicated by the respective entries of the extracted correspondence table 153 and the detected correspondence table 152 (S210), and advances the processing to Step S208. As a result, the user can easily grasp the correspondence between the sensor data table 45 at the application destination and the description column and the destination column of the defect factor analysis table 24 using the correspondence diagram.

On the other hand, in Step S205, when it is not possible to connect the column of the sensor data to the description column and the destination column (S205: No), the data correspondence selection unit 124 registers the unresolved relationship in the unresolved correspondence table 154 (S207).

Next, the result display processing unit 125 displays a result confirmation screen (for example, an analysis application data mapping result correction screen 1601 (see FIG. 16)) including the information of the target analysis application of the analysis application table 23, the undetected correspondence table 151, the extracted correspondence table 153, and the unresolved correspondence table 154 (S301).

Next, the result correction unit 128 determines whether a target to be corrected has been selected from the extracted correspondence table 153 or the unresolved correspondence table 154 by the user and a correction instruction has been received (S302), and advances the processing to Step S302 when the correction instruction has not been received (S302: No).

On the other hand, when a correction instruction has been received (S302: Yes), the result correction unit 128 extracts an alternative correspondence based on the specified information (S303), deletes the alternative correspondence from the unresolved correspondence table 154 based on the extracted content and registers the alternative correspondence in the extracted correspondence table 153 (S304).

Next, the result correction unit 128 determines whether an entry of the unresolved correspondence table 154 remains (S305), advances the processing to Step S302 when an entry remains (S305: Yes), and advances the processing to Step S206 when no entry remains (S305: No).

According to the processing from Steps S302 to S305, the user can designate an appropriate correspondence and correct the correspondence between the sensor data and the column of the defect factor analysis table 24.

Next, the connection relationship extraction processing (Step S201 in FIG. 11) will be described in detail.

Figure 13:
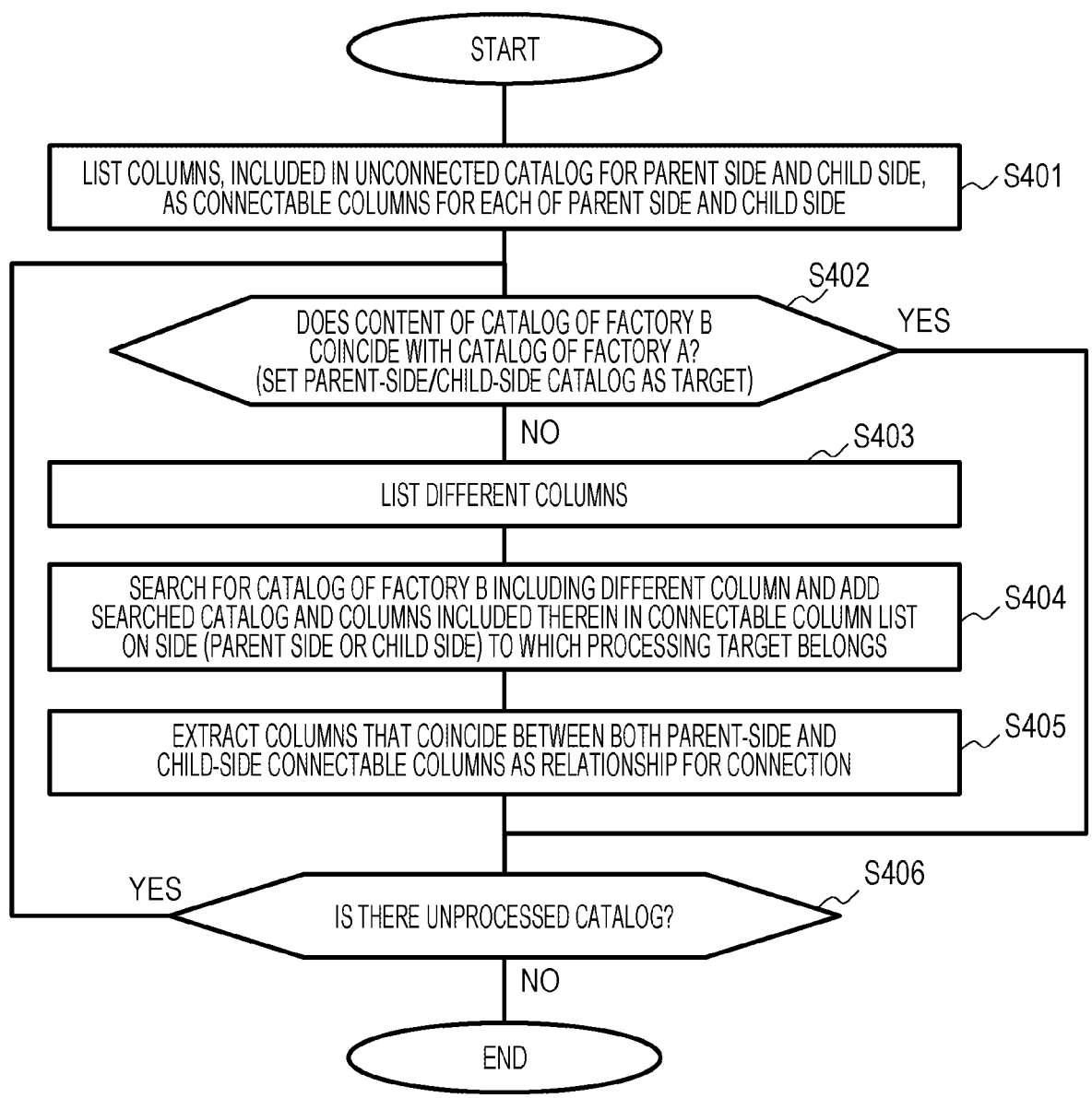
FIG. 13 is a flowchart of connection relationship extraction processing according to the embodiment.

FIG. 13 is a flowchart of the connection relationship extraction processing according to the embodiment.

Here, the following cases (1) and (2) can be considered as reasons why the undetected correspondence exists.

(1): Since a data management method is different between the factory A and the factory B, a new table exists, and a new catalog exists. For example, the work section catalog 407 corresponds to such a case in the examples of FIGS. 6 and 7.

(2): A column name or a catalog name storing the same content as that in the factory A is different in the catalog in the factory B, and it is difficult to directly use a correspondence in the factory A. In this case, it is preferable to determine the identity between a column of factory A and a column of factory B using general dictionary information or dictionary information designated at the application destination (the factory B in this example). For example, when "work section ID" and "work place ID" exist as columns, these columns may be determined to be the same since "section" represents a place using the general dictionary information. Alternatively, the columns may be determined to be the same using dictionary information (application destination dictionary information) designated by the application destination such that the work place ID of the factory B and the work section ID of the factory A are the same. Further, a similarity between pieces of actual data stored in columns may be determined, and whether the columns are the same may be determined based on the similarity. Incidentally, when it is identified that columns are the same in the data selection processing, column names of the identified columns may be stored in the application destination dictionary information in association with each other, and may be reused in the subsequent data selection processing.

Here, the connection relationship extraction processing for dealing with the case (1) will be described below. In the following description, a specific example in which configurations of the catalogs of the factory A are in the state illustrated in FIGS. 3 and 4, and configurations of the catalogs in the factory B are in the state illustrated in FIGS. 6 and 7 will be described as appropriate.

First, the data correspondence selection unit 124 lists columns included in an unconnected catalog as connectable columns for the parent side (the sensor data table 35 (sensor data catalog 301) side) and the child side (the defect factor analysis table 24 side) regarding an unconnected catalog (the worker catalog 405 in this specific example) based on the undetected correspondence table 151 (S401). In this specific example, a parent-side list (parent-side connectable column list) including all the columns of the factory equipment catalog 402, which are the parent-side columns, and a child-side list (child-side connectable column list) including all the columns of the worker catalog 405, which are child-side columns, are created. Here, information in which a catalog name and a column name are paired is stored in each connectable column list. Here, the catalog on the parent side as a processing target may be, for example, a catalog in a partial range on the sensor data catalog 301 side or may include the sensor data catalog 301. In addition, the catalog on the child side as a processing target may be, for example, a catalog in a partial range on the defect factor analysis table 24 side.

Next, the data correspondence selection unit 124 sets the parent-side catalog or the child-side catalog as the processing targets, and determines whether the content (column) of the catalog of the factory B coincides with a corresponding catalog of the factory A (S402). As a result, when the content of the catalog of the factory B coincides with the catalog of the factory A (S402: Yes), it is difficult to use the catalog for connection, and thus, the data correspondence selection unit 124 advances the processing to Step S406 in order to set another catalog (for example, another child-side catalog or parent-side catalog when the child-side catalog is set as the processing target) as a processing target.

On the other hand, when the content of the catalog of the factory B does not coincide with the catalog of the factory A (S402: No), the data correspondence selection unit 124 lists different columns (difference columns) (S403). In this specific example, for example, columns having different "work instruction IDs" in the worker catalog 405 correspond to the difference columns.

Next, the data correspondence selection unit 124 searches for another catalog of the factory B including a different column, and adds all the columns of the found catalog to the connectable column list on the side (parent side or child side) to which the processing target catalog belongs if a catalog is found (S404). In a specific example, all the column names of the work section catalog 407 including the column of the work instruction ID are added to the child-side connectable column list.

Next, the data correspondence selection unit 124 identifies columns that coincide between the connectable column lists on the parent side and the child side, and extract the parent-side catalog including the column and the child-side catalog including the column as a relationship (correspondence) connecting the column as a join key (S405). In a specific example, the factory equipment catalog 402 is extracted as the parent-side catalog, the work section catalog 407 is extracted as the child-side catalog, and the device ID is extracted as the join key. Here, the work section catalog 407 corresponds to the connectable catalog.

Next, the data correspondence selection unit 124 determines whether there is an unprocessed catalog which has not been set as a processing target in either the parent side or the child side (S406), and advances the processing to Step S402 when there is an unprocessed catalog (S406: Yes), and ends the processing when there is no unprocessed catalog (S406: No).

According to the connection relationship extraction processing, it is possible to easily and appropriately extract the data relationship to obtain the defect factor analysis table 24 from the sensor data table 45.

In the connection relationship extraction processing for dealing with the case of (2), it is preferable to search for a catalog including a column with a high similarity with a different column using the dictionary information in Step S404 of the above-described processing. In addition, when it is difficult to find a relationship having an appropriate connection relationship through the above-described connection relationship extraction processing, selection of an alternative sensor data table may be prompted or selected. In this case, the alternative sensor data table may be selected based on a similarity of a column name, or the alternative sensor data table may be selected based on a similarity of data in a column.

Next, the analysis application data result confirmation screen 1401 will be described.

FIG. 14 is a diagram illustrating the analysis application data result confirmation screen according to the embodiment.

The analysis application data result confirmation screen 1401 is an example of a screen displayed in Step S206, and includes an analysis application information display area 1402, a correspondence change result display area 1403, an expand button 1404, a correct button 1405, and an OK button 1406.

In the analysis application information display area 1402, information on a target analysis application is displayed based on the analysis application table 23. The correspondence change result display area 1403 displays the content of the undetected correspondence table 151, the content of the extracted correspondence table 153, and the content of the unresolved correspondence table 154. In the correspondence change result display area 1403, a display mode may be made different by highlighting a catalog name or a column name corresponding to an unconnected correspondence, for example, by making a display color darker or the like. According to the content of the undetected correspondence table 151 of the correspondence change result display area 1403, the information of the unconnected correspondences and the respective correspondences existing on the paths of the correspondences not connected from the columns of the sensor data catalog 401 including such a correspondence to the columns of the defect factor analysis table 24 is included, and thus, it is understood that the user only needs to examine a path connected from the sensor data table 45 to the defect factor analysis table 24 via any of the respective catalogs on these paths.

The expand button 1404 is a button configured to give an instruction to display a correspondence diagram illustrating the correspondence of each data for selection of the defect factor analysis table 24 from the sensor data 45 in the factory B including the correspondences in the currently displayed extracted correspondence table 153. When the expand button 1404 is pressed, the result display processing unit 125 displays the analysis application data selection result display screen 1501 illustrated in FIG. 15.

The correct button 1405 is a button configured to given an instruction to correct the correspondence or the like in the currently displayed extracted correspondence table 153. When the correct button 1405 is pressed, the result display processing unit 125 displays the analysis application data result correction screen 1601 illustrated in FIG. 16.

The OK button 1406 is a button configured to confirm the correspondence in the currently displayed extracted correspondence table 153. When the OK button 1406 is pressed, the correspondence of each data for selection of the defect factor analysis table 24 from the sensor data 45 at that time is confirmed, and, for example, the extracted analysis data correspondence table 155 is generated.

Next, the analysis application data selection result display screen 1501 will be described.

Figure 15:
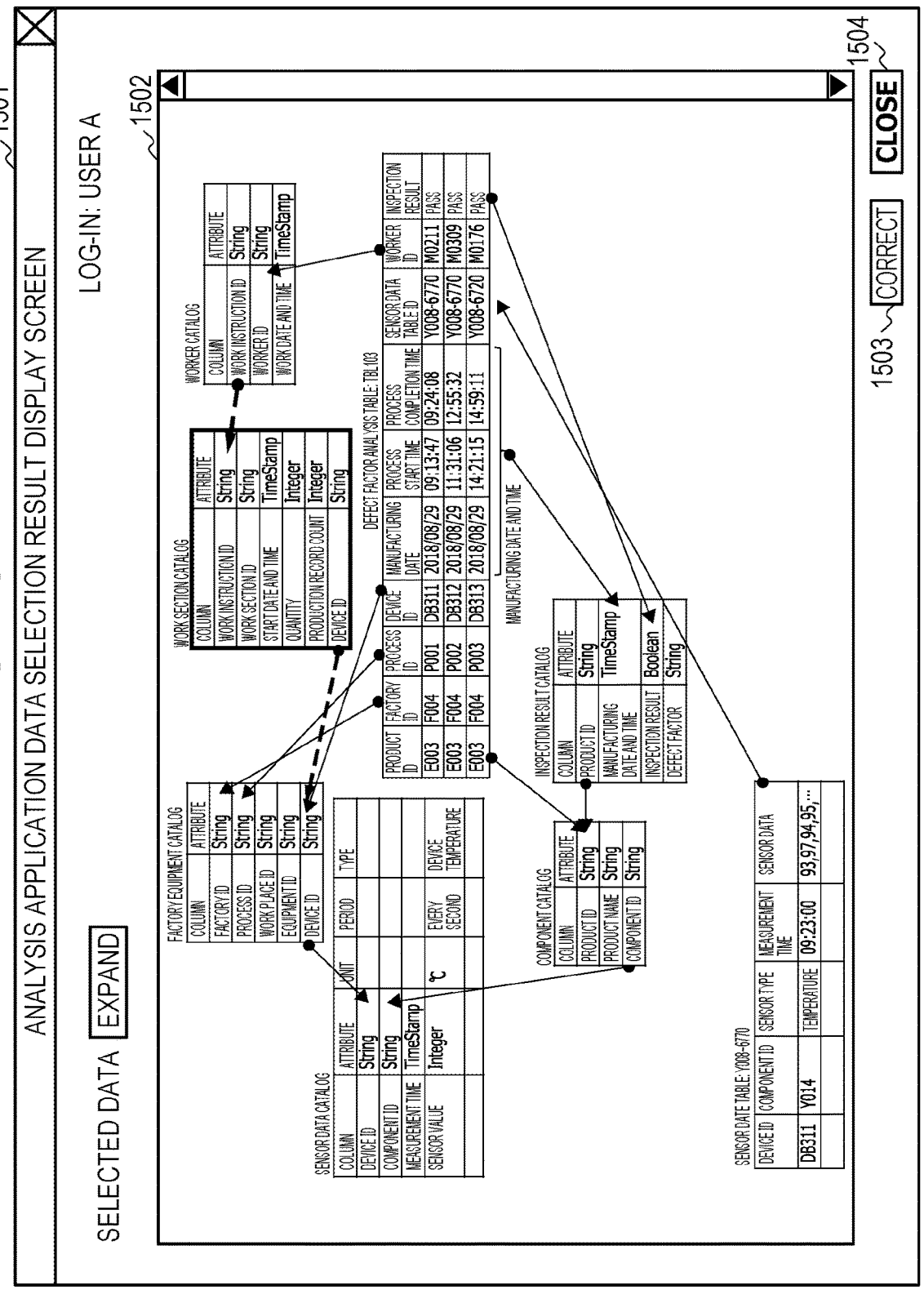
FIG. 15 is a diagram illustrating an analysis application data selection result display screen according to the embodiment.

FIG. 15 is a diagram illustrating the analysis application data selection result display screen according to the embodiment.

The analysis application data selection result display screen 1501 is an example of a screen displayed when the expand button 1404 of the analysis application data result confirmation screen 1401 is pressed, and includes a selection result display area 1502, a correct button 1503, and a CLOSE button 1504.

The selection result display area 1502 is an area in which a correspondence diagram illustrating a correspondence of each data for selection of the defect factor analysis table 24 from the sensor data 45 at the application destination (in the example of the drawing, the factory B) is displayed.

The correct button 1503 is a button configured to give an instruction to correct a correspondence corresponding to the currently displayed correspondence diagram. When the correct button 1503 is pressed, the result display processing unit 125 displays the analysis application data result correction screen 1601 illustrated in FIG. 16.

The CLOSE button 1504 is a button configured to give an instruction to close the analysis application data selection result display screen 1501. When the CLOSE button 1504 is pressed, the result display processing unit 125 closes the analysis application data selection result display screen 1501.

Next, the analysis application data result correction screen 1601 will be described.

Figure 16:
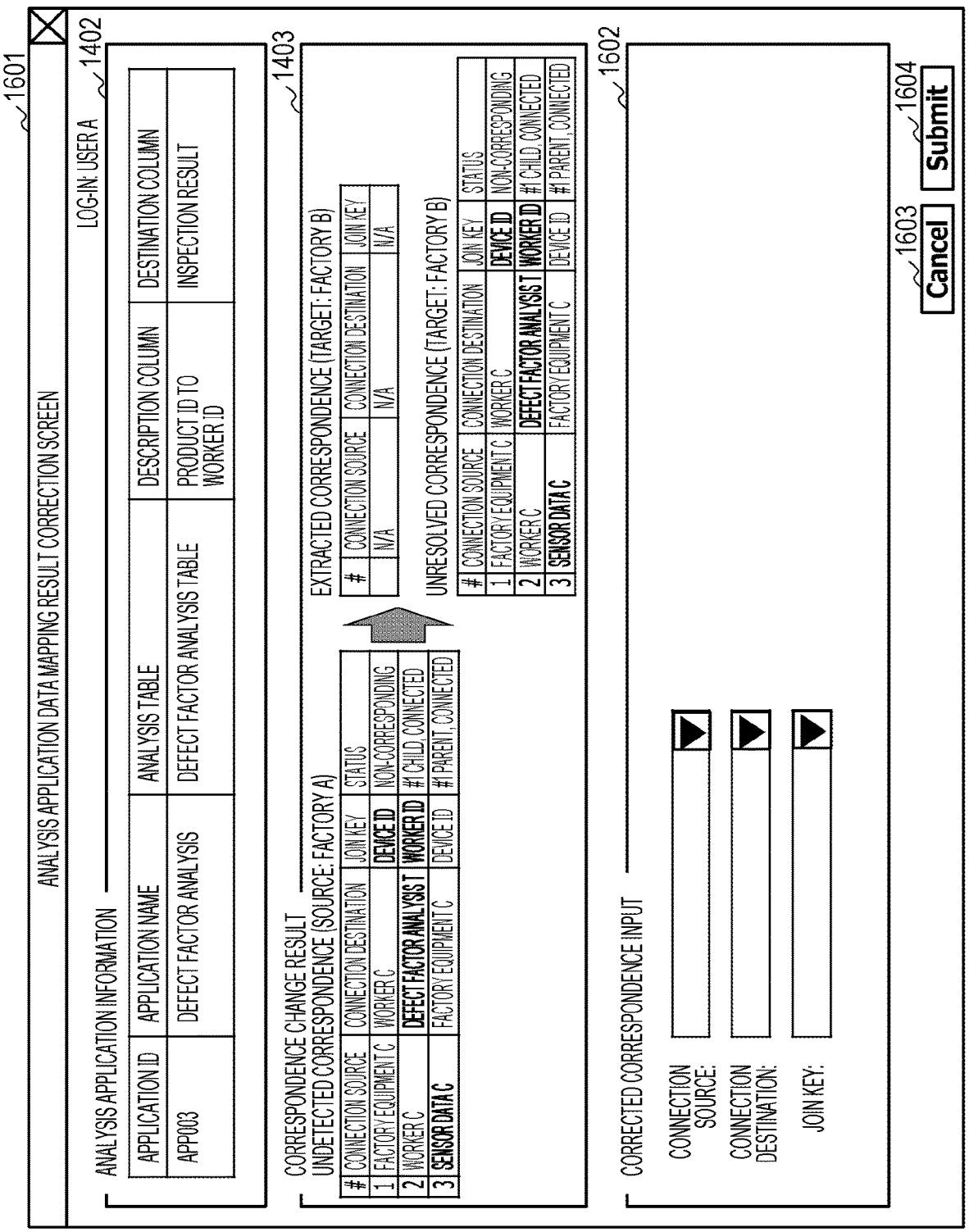
FIG. 16 is a diagram illustrating an analysis application data result correction screen according to the embodiment.

FIG. 16 is a diagram illustrating the analysis application data result correction screen according to the embodiment.

The analysis application data result correction screen 1601 is an example of a screen that is displayed when the correct button 1405 of the analysis application data result confirmation screen 1401 is pressed or displayed in Step S301, and includes the analysis application information display area 1402, the correspondence change result display area 1403, a corrected correspondence input area 1602, a Cancel button 1603, and a Submit button 1604.

The corrected correspondence input area 1602 is an area configured to selectively input a connection source catalog and a connection destination catalog, which are connected to have a correspondence, and a join key which is a column connecting these catalogs.

The Cancel button 1603 is a button configured to give an instruction to cancel the correspondence input in the corrected correspondence input area 1602. When the Cancel button 1603 is pressed, the analysis application data result correction screen 1601 is closed without reflecting the correspondence input in the corrected correspondence input area 1602 by the result display processing unit 125.

The Submit button 1604 is a button configured to give an instruction to transmit (apply) the adaptation of the correspondence input to the corrected correspondence input area 1602. When the Submit button 1604 is pressed, the result display processing unit 125 registers the correspondence input to the corrected correspondence input area 1602 in the extracted correspondence table 153, and deletes the correspondence resolved by the registered correspondence from the unresolved correspondence table 151.

According to the analysis application data result correction screen 1601, the user can appropriately input and correct the correspondence in the factory B.

For example, an analysis application data result correction screen 1701 may be displayed instead of the analysis application data result correction screen 1601 illustrated in FIG. 16.

FIG. 17 is a diagram illustrating the analysis application data result correction screen according to a modification.

The analysis application data result correction screen 1701 includes an analysis application information display area 1402, a correspondence change result display area 1403, a corrected correspondence input area 1702, a cancel button 1603, and a submit button 1604.

The corrected correspondence input area 1702 is an area in which a difference information display area 1703 is further provided with respect to the corrected correspondence input area 1602. The difference information display area 1703 is an area in which a target catalog and a different point of columns between a catalog of an application source (the factory A in the example) and a catalog of an application destination (the factory B in the example) are displayed. A user can examine a correspondence using difference information in the difference information display area 1703 as a clue and can easily correct the correspondence.

Next, difference list display processing configured to display the difference information 1703 on the analysis application data result correction screen 1701 will be described.

Figure 18:
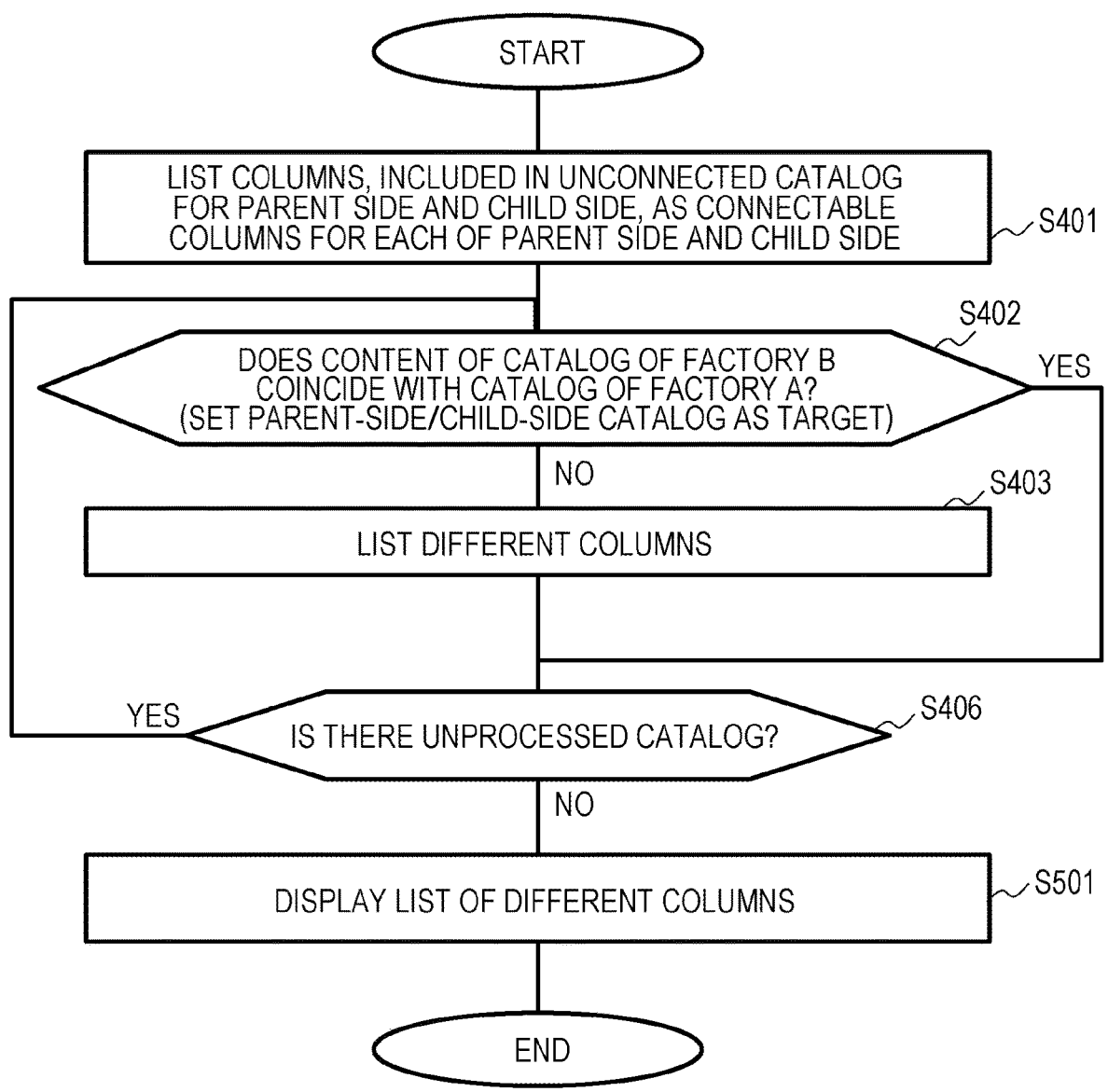
FIG. 18 is a flowchart of difference list display processing according to a modification.

FIG. 18 is a flowchart of the difference list display processing according to the modification. Incidentally, steps similar to those in FIG. 16 are denoted by the same reference signs, and the redundant description thereof is omitted.

In Step S501, the result correction unit 128 of the result display processing unit 125 displays the list of different columns in the difference information display area 1703 of the corrected correspondence input area 1702 of the analysis application data result correction screen 1701.

Incidentally, the present invention is not limited to the above-described embodiments, and can be appropriately modified and implemented within a range not departing from a spirit of the present invention.

For example, the alternative correspondence is extracted (S303) and is registered in the extracted correspondence table 154 (S304) when the correction instruction has been received from the user (S302: Yes), and the processing proceeds to Step S302 to receive further correction from the user when there is an unresolved correspondence (S305: No) in the above embodiment, but the present invention is not limited thereto. For example, the processing of Step S103 and the subsequent steps may be performed in the state of maintaining the corrected correspondence after Step S304 so as to find a correspondence that does not exist even after the correction.

In addition, some or all of the processes performed by the CPU in the above embodiments may be performed by a hardware circuit. In addition, the program in the above embodiments may be installed from a program source. The program source may be a program distribution server or a storage media (for example, a portable storage media).

What is claimed is:

1. A data selection system configured to select data of an application table for use in an application capable of executing predetermined processing based on a plurality of tables in a predetermined object, the data selection system comprising:
a processor unit; and
a storage unit connected to the processor unit,
wherein the storage unit stores a first catalog group including a plurality of catalogs indicating column configurations of a plurality of tables in a first object, a second catalog group including a plurality of catalogs indicating column configurations of a plurality of tables in a second object, and first correspondence information indicating correspondences of columns of a plurality of catalogs that associate columns between a target table of the first object and the application table, and
the processor unit
identifies an unconnected catalog for which a catalog of the second object having an identical correspondence does not exist among the plurality of catalogs of the first object included in the first correspondence information based on the first correspondence information and the second catalog group,
identifies an unconnected correspondence, which is a correspondence of the unconnected catalog in the first correspondence information, and an identical path correspondence which is a correspondence of a catalog on a path including the unconnected catalog among a plurality of catalogs that connect the columns between the target table of the first object and the application table, and
displays information of the unconnected correspondence and information of the identical path correspondence.

2. The data selection system according to claim 1, wherein the processor unit
extracts a connectable catalog, which is a catalog of a table for which a column connection relationship between the target table and the application table connected based on the unconnected correspondence is implementable, from the second catalog group, and
displays a correspondence via the connectable catalog.

3. The data selection system according to claim 2, wherein the processor unit generates second correspondence information indicating a correspondence between columns of a plurality of catalogs that associate columns between a target table of the second object and the application table including a correspondence of the extracted connectable catalog.

4. The data selection system according to claim 3, wherein the processor unit
acquires a plurality of tables in the second object, and
generates the application table based on the plurality of tables and the second correspondence information.

5. The data selection system according to claim 4, wherein the processor unit executes the application using the generated application table.

6. The data selection system according to claim 3, wherein the first correspondence information includes information on a connection source catalog, a connection destination catalog, and a column that associates tables corresponding to the connection source catalog and the connection destination catalog.

7. The data selection system according to claim 2, wherein the first correspondence information includes information on a connection source catalog, a connection destination catalog, and a column that associates tables corresponding to the connection source catalog and the connection destination catalog.

8. The data selection system according to claim 2, wherein the processor unit
identifies a difference column which is a column that not exist in the unconnected catalog but exists only in a catalog of the second catalog group corresponding to the unconnected catalog, and
extracts a catalog including the difference column and including an identical column as a column of a catalog having a connection relationship with the unconnected catalog from the second catalog group as the connectable catalog.

9. The data selection system according to claim 8, wherein when a name of a column of the first object and a name of a column of the second object coincide or are similar, the processor unit recognizes that the columns are identical.

10. The data selection system according to claim 8, wherein
when a name of a column of the first object and a name of a column of the second object coincide or are similar and data of the column of the first object and data of the column of the second object are data having an identical type, the processor unit recognizes that the columns are identical.

11. The data selection system according to claim 1, wherein the processor unit receives a correspondence including a connection source catalog, a connection destination catalog, and a column associating both the catalogs from a user, and causes the received correspondence to be included in second correspondence information indicating a correspondence between columns of a plurality of catalogs that associate columns of a target table of the second object and the application table.

12. The data selection system according to claim 11, wherein the processor unit displays a difference of an included column between a catalog of the first object and a catalog of the second object corresponding to the catalog of the first object.

13. The data selection system according to claim 11, wherein the processor unit acquires a plurality of tables in the second object, and generates the application table based on the plurality of tables and the second correspondence information.

14. The data selection system according to claim 1, wherein the target table is a table that stores sensor data acquired by a sensor in the object.

15. A data selection method to be performed by a data selection system configured to select data of an application table for use in an application capable of executing predetermined processing based on a plurality of tables in a predetermined object, the data selection method comprising:

storing a first catalog group including a plurality of catalogs indicating column configurations of a plurality of tables in a first object, a second catalog group including a plurality of catalogs indicating column configurations of a plurality of tables in a second object, and first correspondence information indicating correspondences of columns of a plurality of catalogs that associate columns between a target table of the first object and the application table;

identifying an unconnected catalog for which a catalog of the second object having an identical correspondence does not exist among the plurality of catalogs of the first object included in the first correspondence information based on the first correspondence information and the second catalog group;

identifying an unconnected correspondence, which is a correspondence of the unconnected catalog in the first correspondence information, and an identical path correspondence which is a correspondence of a catalog on a path including the unconnected catalog among a plurality of catalogs that connect the columns between the target table of the first object and the application table; and displaying information of the unconnected correspondence and information of the identical path correspondence.

* * * * *